(12) United States Patent
Cao et al.

(10) Patent No.: US 9,465,507 B2
(45) Date of Patent: Oct. 11, 2016

(54) TECHNIQUES TO FACILITATE ASYNCHRONOUS COMMUNICATION

(75) Inventors: Xiang Cao, Beijing (CN); Guang Li, Beijing (CN); Sergio Paolantonio, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 999 days.

(21) Appl. No.: 13/277,042

(22) Filed: Oct. 19, 2011

(65) Prior Publication Data

US 2013/0104054 A1   Apr. 25, 2013

(51) Int. Cl.
*G06F 17/00* (2006.01)
*G06F 3/0481* (2013.01)
*G06F 3/038* (2013.01)

(52) U.S. Cl.
CPC ............. *G06F 3/0481* (2013.01); *G06F 3/038* (2013.01); *G06F 2203/0381* (2013.01)

(58) Field of Classification Search
CPC ............. G06F 17/241; G06F 3/0481; H04N 21/2368
USPC ................ 715/201, 202, 203, 230, 232, 704
See application file for complete search history.

(56) References Cited

U.S. PATENT DOCUMENTS 5,801,687 A * 9/1998 Peterson et al. ............. 715/201
6,195,685 B1 2/2001 Mukherjee et al.
7,458,013 B2 * 11/2008 Fruchter et al. ............. 715/203
2004/0122693 A1 6/2004 Hatscher et al.
2010/0070878 A1 3/2010 Amento et al.
2011/0025715 A1 2/2011 Uchida et al.

FOREIGN PATENT DOCUMENTS

| CN | 101188620 | 5/2008 |
| EP | 2375342 A2 | 10/2011 |
| KR | 20060031768 A | 4/2006 |
| KR | 1020090106755 A | 10/2009 |

OTHER PUBLICATIONS

Aubrey, "Sketching User Experiences: Getting the Design Right and the Right Design by Bill Baxton", ORCA Views Book Review, Winter 2007, 4 pgs.
Bae et al, "ILoveSketch: As Natural As Possible Sketching System for Creating 3D Curve Models", UIST 08, Oct. 2008, pp. 151-160.
Bargeron et al, "Asynchronous Collaboration Around Multimedia Applied to on Demand Education", Journal of Management Informantion Systems, vol. 18, No. 4, Spring 2002, 19 pgs.
Brandl et al, "NiCEBook—Supporting Natural Note Taking", CHI 2010, Apr. 2010, 10 pgs.
Brinck et al, "A Collaborative Medium for the Support of Conversational Props", CSCW 92, Oct. and Nov. 1992, 9 pgs.

(Continued)

*Primary Examiner* — Haoshian Shih
(74) *Attorney, Agent, or Firm* — Sandy Swain; Micky Minhas; Lee & Hayes, PLLC

(57) ABSTRACT

Users may communicate an idea asynchronously by including contextual information. The contextual information may be presented in multimodal annotations, suggestions of logical idea progression, and a chronological history of the project creation. The contextual information may include content captured from the real-world including from the user's immediate environment or elsewhere.

20 Claims, 39 Drawing Sheets

(56) References Cited

OTHER PUBLICATIONS

Cao etal, "Telling the Whole Story: Anticipation, Inspiration and Reputation in a Field Deployment of TellTable", CSCW 2010, Feb. 2010, pp 251-260.
Carroll et al, "Creativity Factor Evaluation: Towards a Standardized Survey Metric for Creativity Support", C&C 09, Oct. 2009, 10 pgs.
David et al, "K-Sketch: A "Kinetic" Sketch Pad for Novice Animators", CHI 2008, Apr. 2008, 10 pgs.
Follmer et al, "CopyCAD: Remixing Physical Objects with Copy and Paste from the Real World", UIST 10, Oct. 2010, pp. 381-382.
"Google Maps", Cosketch.com, News/Blog, retrieved Jul. 20, 2011 at http://cosketch.com/Blog, 2 pgs.
Greenberg et al, "GroupSketch: A Multi-user Sketchpad for Geographically Distributed Small Groups", Graphical Interface, Jun. 1991, 9 pgs.
Hart et al, "Development of NASA-ZTLX (Task Load Index): Results of Empirical and Theorectical Research", Human Mental Workload, in P.A. Hancock & N. Meshkati (Eds), North Holland Press, 1988, 45 pgs.
Hartmann et al, "Pictionaire: Supporting Collaborative Design Work by Integrating Physical and Digital Artifacts", CSCW 2010, Feb. 2010, 4 pgs.
Hinckley et al, "InkSeine: In Situ Search for Active Note Taking", CHI 2007, Apr. 2007, 10 pgs.
Hunter et al, "MemTable: An Integrated System for Capture and Recall of Shared Histories in Group Workspaces", CHI 2011, May 2001, 10 pgs.
Jung et al, "Sketching Annotations in a 3D Web Environment", CHI Extended Abstracts, Apr. 2002, 2 pgs.
Landay et al, "Interactive Sketching for the Early Stages of User Interface Design", CHI, Jul. 1995, 8 pgs.
Lin et al, "DENIM: An Informal Tool for Early Stage Web Slte Design", CHI Entended Abstracts, Mar. and Apr. 2001, 2 pgs.
Martens et al, "Design TeamMate: A Platform to Support Design Activities of Small Teams", AVI May 2010, Advanced Visual Interfaces, pp. 119-126.
Microsoft, "OneNote 2010", Planner and note taking software—office.com, retrieved Jul. 19, 2011 at http://office.microsoft.com/en-us/onenote/, 1 pgs.
Petkovic et al, "Asynchronous Multimedia Annotations for Web Based Collaboration in Biology Education", Storage and Retrieval Methods and Applications for Multimedia, vol. 5682, Jan. 2005, 6 pgs.
Ryokai et al, "I/O Brush: Drawing with Everyday Objects as Ink", Proc CHI 2004, Apr. 2004, 8 pgs.
Sciascio et al, "Content Based Image Retrieval Over the Web Using Query by Sketch and Relevance Feedback", Third Intl Conf on Visual Information and Information Systems, Jun. 1999, 8 pgs.
Swan et al, "Design's Processional Character", DIS 2010, Aug. 2010, pp. 65-74.
Tsang et al, "Boom Chameleon: Simultaneous Capture of 3D Viewpoint, Voice and Gesture Annotations on a Spatially Aware Display", UIST, Oct. 2002, pp. 111-120.
Wikipedia "Paint Chat", retrieved on Jul. 20, 2011 at http://en.wikipedia.org/wiki/Paint_chat, 3 pgs.
The Chinese Office Action mailed Jan. 12, 2015 for Chinese patent application No. 201210401349.7, a counterpart foreign application of U.S. Appl. No. 13/277,042, 9 pages.
Translated Chinese Office Action mailed Sep. 29, 2015 for Chinese patent application No. 201210401349.7, a counterpart foreign application of U.S. Appl. No. 13/277,042, 11 pages.
The PCT Search Report and Written Opinion mailed Mar. 29, 2013 for PCT Application No. PCT/US2012/060895, 10 pages.

* cited by examiner

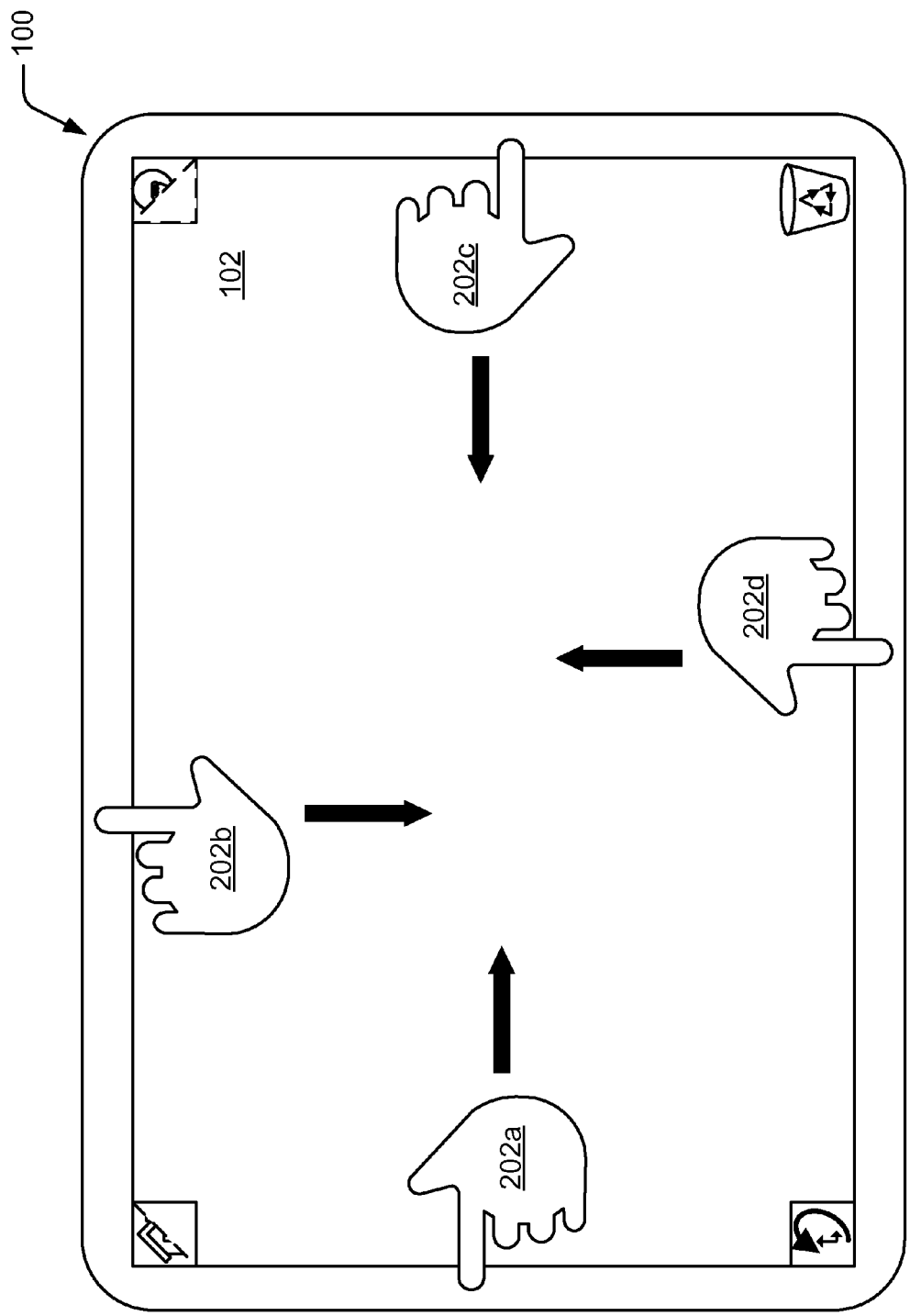

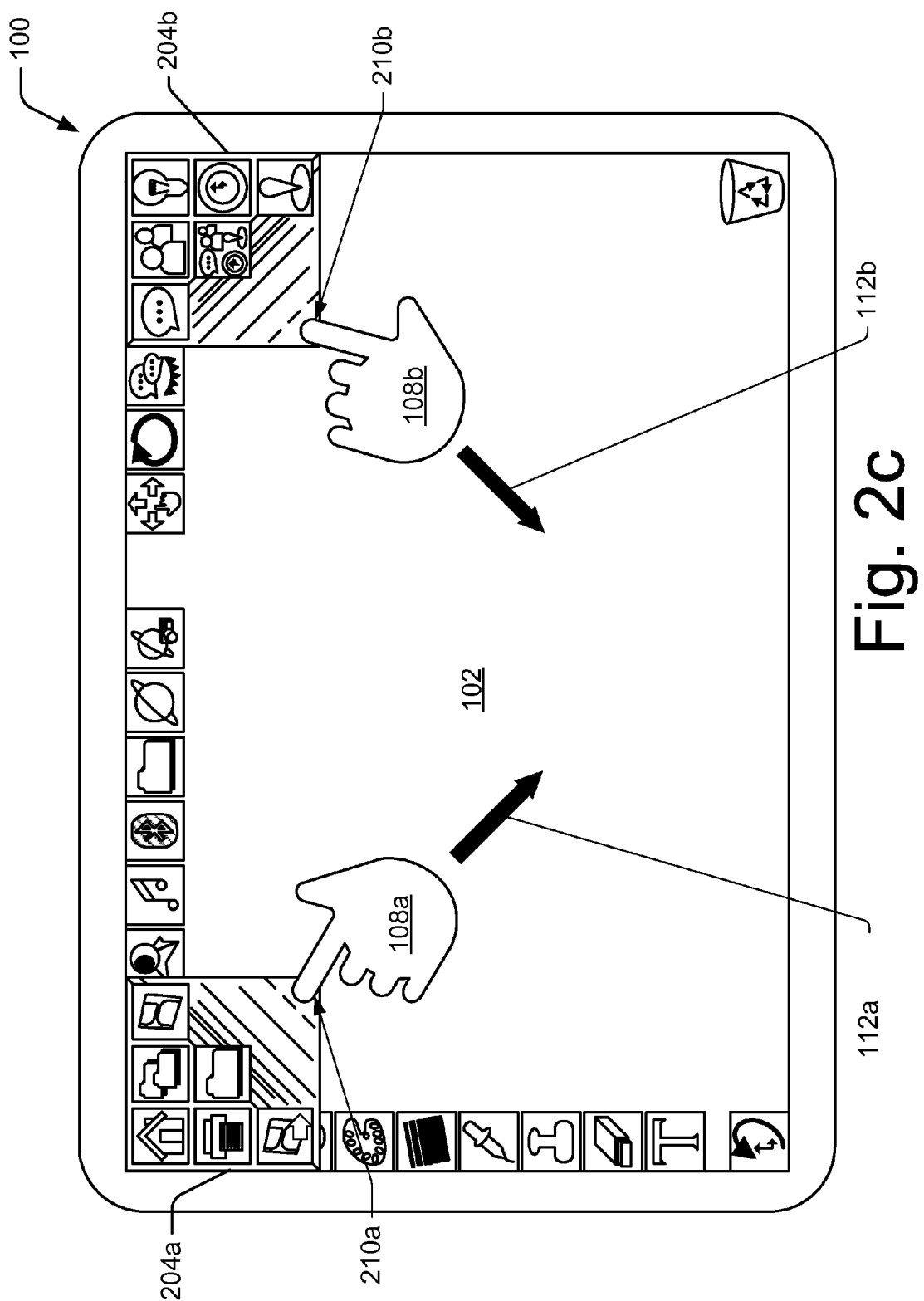

TECHNIQUES TO FACILITATE ASYNCHRONOUS COMMUNICATION

BACKGROUND

Typically, when creative people (for example, designers) explain their early ideas to others, they use face-to-face communication. As part of the face-to-face communication sketches are often drawn and discussed. In practice, however, a face-to-face meeting may not be possible, practicable, or feasible, and people may have to rely on asynchronous communication.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The subject of this disclosure describes techniques to facilitate asynchronous communication. Asynchronous communication may be facilitated by providing context for the ideas being communicated. The context may be provided by capturing information from a user, a user's surrounding environment, or an environment distant from the user. The captured information may be included in multimodal annotations used to provide context for the idea presented. The representations of the ideas and the information captured to provide context may be assembled, modified, and viewed in a project setting. The project setting may provide for the communication of multiple ideas where each idea may have multiple features or elements.

For example, in an implementation, a user may attempt to convey an idea with a main sketch. To give the sketch context and to more effectively communicate the idea, the user may include an annotation that shows an image or picture of an object from the user's desk. The image combined with additional text or another simple sketch explains the significance of a portion of the main sketch. The user may also include a voice recording of the user explaining a portion of the main sketch. An indicator may be provided on the main sketch that shows that the additional information (e.g., annotation, picture, text, sketch, voice recording, or video clip) is available.

In an implementation, a user may indicate a logical order in which to review a project, an idea, features of an idea, contextual information for an idea, or a combination thereof. This logical order may not coincide with the way the ideas were added to the project chronologically. Rather, the user may suggest that a later viewing audience take note of certain features in a certain, logical, order. The audience may not be bound by this suggestion, but may have the option to follow it.

In an implementation, a user or an audience may review the entire history of the project in a timeline like setting. There, the user or audience may see the progression of the project in forward to backwards directions at various speeds. The user may also jump to different chronological locations along timeline.

BRIEF DESCRIPTION OF THE DRAWINGS

The Detailed Description is set forth with reference to the accompanying figures. In the figures, the left-most digit(s) of a reference number identifies the figure in which the reference number first appears. The use of the same reference numbers in different figures indicates similar or identical items.

FIGS. 2a-c show views of illustrative embodiments of the asynchronous communication system of FIG. 1 with illustrative control options and interfaces.

DETAILED DESCRIPTION

Figure 1:
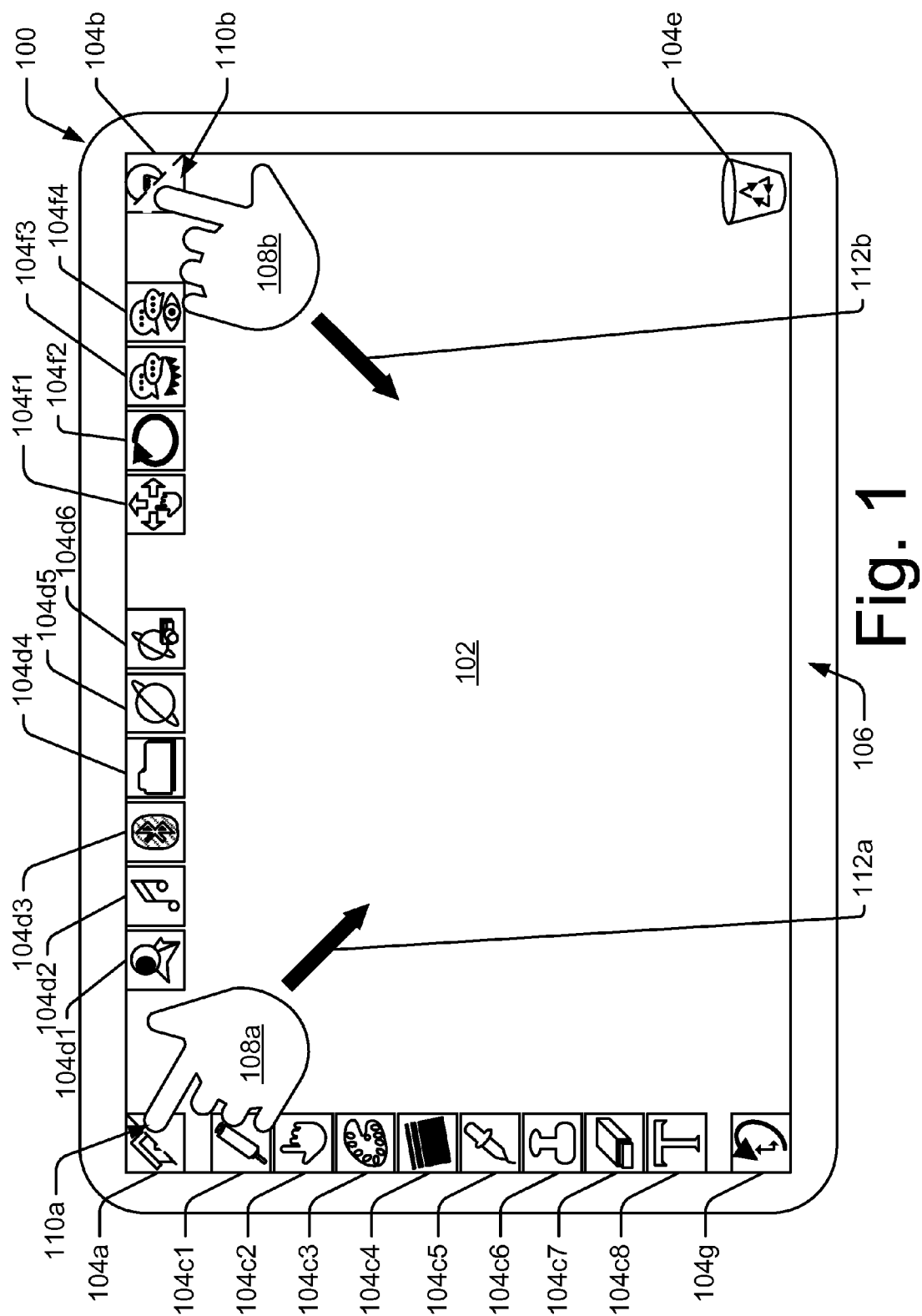
FIG. 1 is a view of an illustrative embodiment of an asynchronous communication system including an illustrative digital canvas with illustrative control options.

This disclosure describes the creation of asynchronous communication material. A user may want to communicate an idea to another person; however, the person may not be available for a face-to-face meeting or available at the same time the user is available. For example, when designers explain their early design ideas to others, they usually use face-to-face communication along with sketches that are often drawn during and as part of the face-to-face communication. In practice, however, sometimes face-to-face meetings are not possible, and designers have to rely on asynchronous communication. Important contextual information that is available in face-to-face meetings often is missing in such asynchronous communications, which can lead to confusion and misunderstandings.

For example, communicating designs to others and getting feedback is a practice in the design profession. Especially in the beginning of a design process, when designers communicate their early design ideas to others, they usually use face-to-face communication along with hand-drawn sketches. Relatively little effort is needed to draw these sketches, saving considerable work that would otherwise be required if using sophisticated digital tools tailored for later-stage expression of concrete and/or finalized designs, such as Photoshop® or 3D Studio®. Indeed, the inherent "roughness" of such sketches matches the preliminary, non-specific, and incomplete nature of early design ideas, and serves as a reminder for the audience to focus its attention and feed-back on the concept rather than the details of the design. All this allows designers to obtain feedback as early as possible in their design process, which may prove to be useful to the success of the design.

However, the casualness and openness of early sketches usually also means that they have to rely on the designer's personal presence to be understood. The rich contextual information available in face-to-face communication, both provided by the designer themselves and from the physical surroundings, complements the sketches to deliver a holistic message. In practice, however, such face-to-face meetings (or even synchronous telecommunications such as audio/video conferences) are not always feasible due to various constraints including conflicts of schedule, geographical distances, time differences, or the need to communicate to multiple audiences. In these situations, designers may have to rely on asynchronous channels. For example, sending their ideas through email in the form of digital sketches and/or written descriptions. However, when taken out of the context of face-to-face communication, sketching as a communication tool may become inadequate on its own for the same reasons that make it powerful otherwise. The non-specificity and lack of details in early sketches without face-to-face communication often leads to confusion and misunderstandings. As a result, designers often set aside asynchronous communication altogether and wait until an opportunity for face-to-face meeting (often too late for early feedback), or they may have to resort to later-stage, and more in-depth, design expression tools and thereby lose all the advantages of hand-drawn sketches.

To assist in communicating an idea while preserving the context and leverage of available information and props, this disclosure introduces systems and techniques for developing asynchronous communication. It may be desirable for the asynchronous communication to be lightweight and reasonably easy for a user to communicate his or her ideas and provide context for the ideas to the audience. One example may be communicating a sketch of an idea with contextual information added to the sketch.

Various embodiments contemplate providing at least two interaction modes: a creation mode, in which the user may create the content for communicating the idea using a mixture of sketch and captured information; and a review mode, in which an audience may review the idea. Some or all of the material created by the user may be stored in a single integrated file, project folder, or a combination of the two, which may then be transferred to an audience through a network including by file sharing or other channels. The audience may then open the project, for example, to view in the review mode.

Illustrative Contextual Information to Capture

One illustrative embodiment of effectively communicating an idea is to capture contextual information to be transmitted along with sketches of the idea. For example, some of the categories of contextual information that are useful in face-to-face communication, but are absent in current asynchronous channels may include: multimodal remarks, real-world references, thought processes and logical order, and communication context. Each is discussed below.

Multimodal Remarks. One of the attributes of face-to-face communication is that the communication is inherently multimodal. Meaning that although the communication of the design idea may be centered around sketches, such static representation may often be constantly augmented by verbal explanations, iconic gestures, dynamic demonstrations, among other modes of communication. These freeform augmentations may provide additional information for the audience to understand beyond what it is conveyed by the sketches themselves. Multimodal remarks may include multimodal information that may comprise one, two, or more elements of text, image, video, audio, audio-video, graphic, touch, haptics, olfaction, or motion.

Real-world References. A common way to facilitate early design communication, especially when explaining concrete artifacts, is to refer to physical objects in the surrounding environment. Such real-world references may be used to easily and vividly illustrate many attributes that may be difficult to describe through abstract sketch or speech, such as shape, color, size, material, sound, or even smell. In addition, designers may often use physical objects as opportunistic props to demonstrate ideas.

Thought Process and Logical Order. Often, understanding the thought process of reaching the design idea may be as important as the resulting idea itself. Seeing the thought process allows the audience not to be overly caught in the specifics of the single design idea, and to better understand the rationale of the designer and provide feedback on a higher conceptual level. This may be especially important in the early design stage, when the idea itself may often be incomplete and open to redefinition. Similarly, communicating a logical order in the idea representation may assist the audience in comprehending the idea. The logical order may not be apparent due to the often unstructured nature and fluid progression of early sketches. Often, this guidance may be given by the designer to the audience through face-to-face communication.

Communication Context. The overall context of the communication session itself, such as topic, time, place, and participants, may not only be useful for the audience to understand the bigger picture of the design project, but perhaps also importantly contextualize their memory of the idea and allow them recall it more easily. This may be equally helpful for both the audience and the designers themselves.

This is not meant to be an exhaustive list of all contextual information available in typical face-to-face communication. It is contemplated that the disclosed system and methods may provide for additional contextual information to be incorporated and communicated through the asynchronous communication.

Illustrative Asynchronous Communication System

FIG. 1 shows an illustrative embodiment of an asynchronous communication system 100 that may be used to capture and communicate contextual information, such as, for example, the contextual information described above.

Figure 2B:
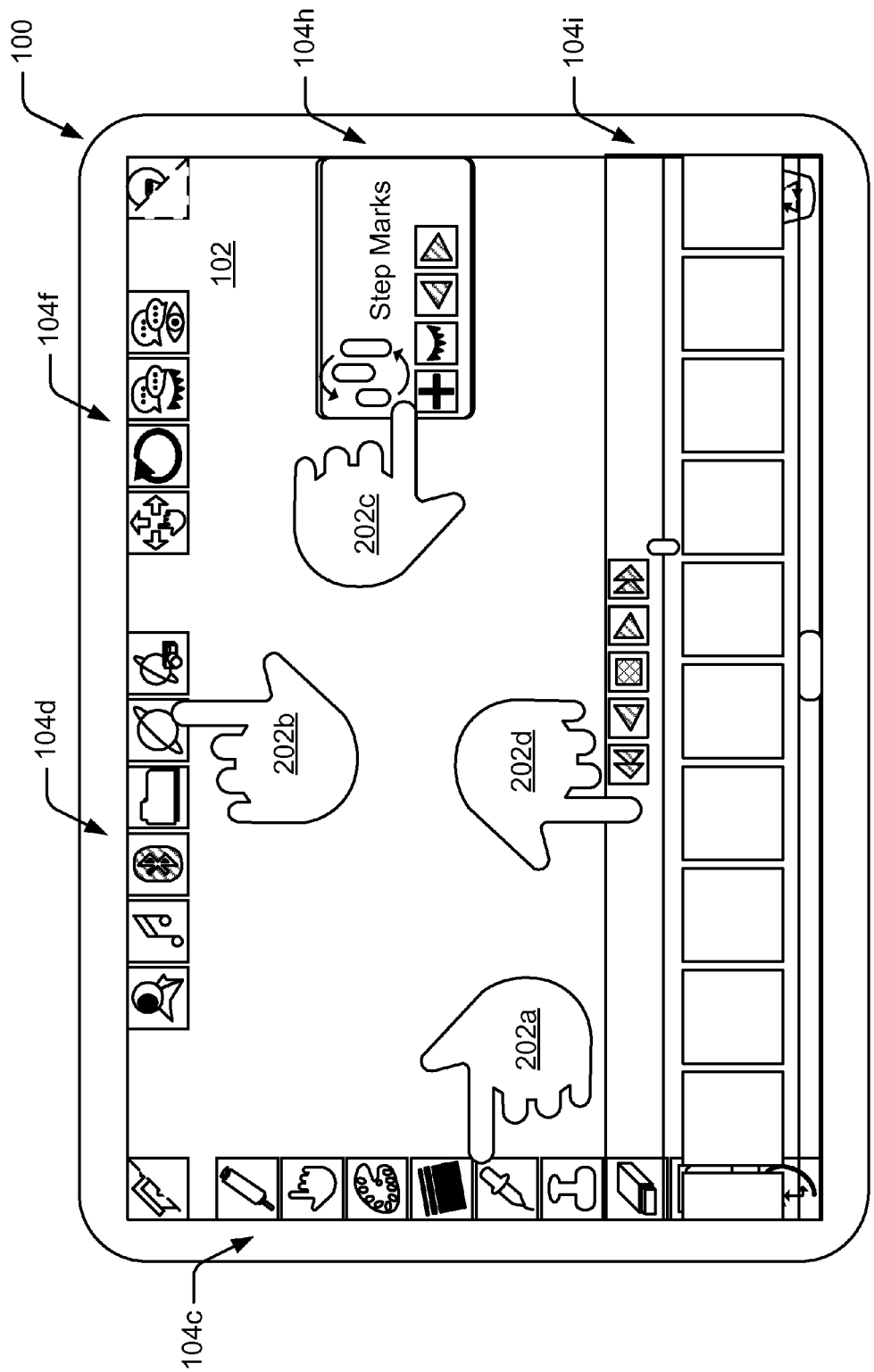

The user is provided a digital canvas 102 that can be freely zoomed and moved. In some embodiments, the digital canvas 102 may be considered to be effectively infinite, limited only by the computing power, storage capacity of the platform, and desire of the user. Interface buttons 104a-g may be used to trigger additional functions and may be distributed along the edges of the display or screen 106. Additionally, or alternatively, the interface buttons 104a-g may be hidden and then displayed. For example, in a touch screen embodiment, a user 202a-d may swipe or brush from the outside edge towards the center of the screen causing the interface buttons 104c, d, f, interfaces 104h, and/or interface 104i to appear and/or appear to be dragged into position as shown in FIGS. 2a-b. Additionally or alternatively, a user may move a mouse cursor into the area of the interface buttons 104c, d, f, interfaces 104h, and/or interface 104i, or to an edge of the display to cause the respective interface buttons and/or interfaces to appear and/or become viewable. The interface buttons 104a-g may be operated using a pen, one or more fingers, a stylus, a mouse, joystick, trackball, and other suitable input device or method. For example, a user may touch the screen 106 with a finger 108a at a location 110a corresponding to interface button 104a and drag the finger 108a in a direction 112a to a position 210a to reveal additional interface buttons 204a as seen in FIG. 2c. Similarly, a finger 108b at a location 110b corresponding to interface button 104b may be drug by the finger 108b in a direction 112b to a position 210b to reveal additional interface buttons 204b also seen in FIG. 2c.

Figure 3:
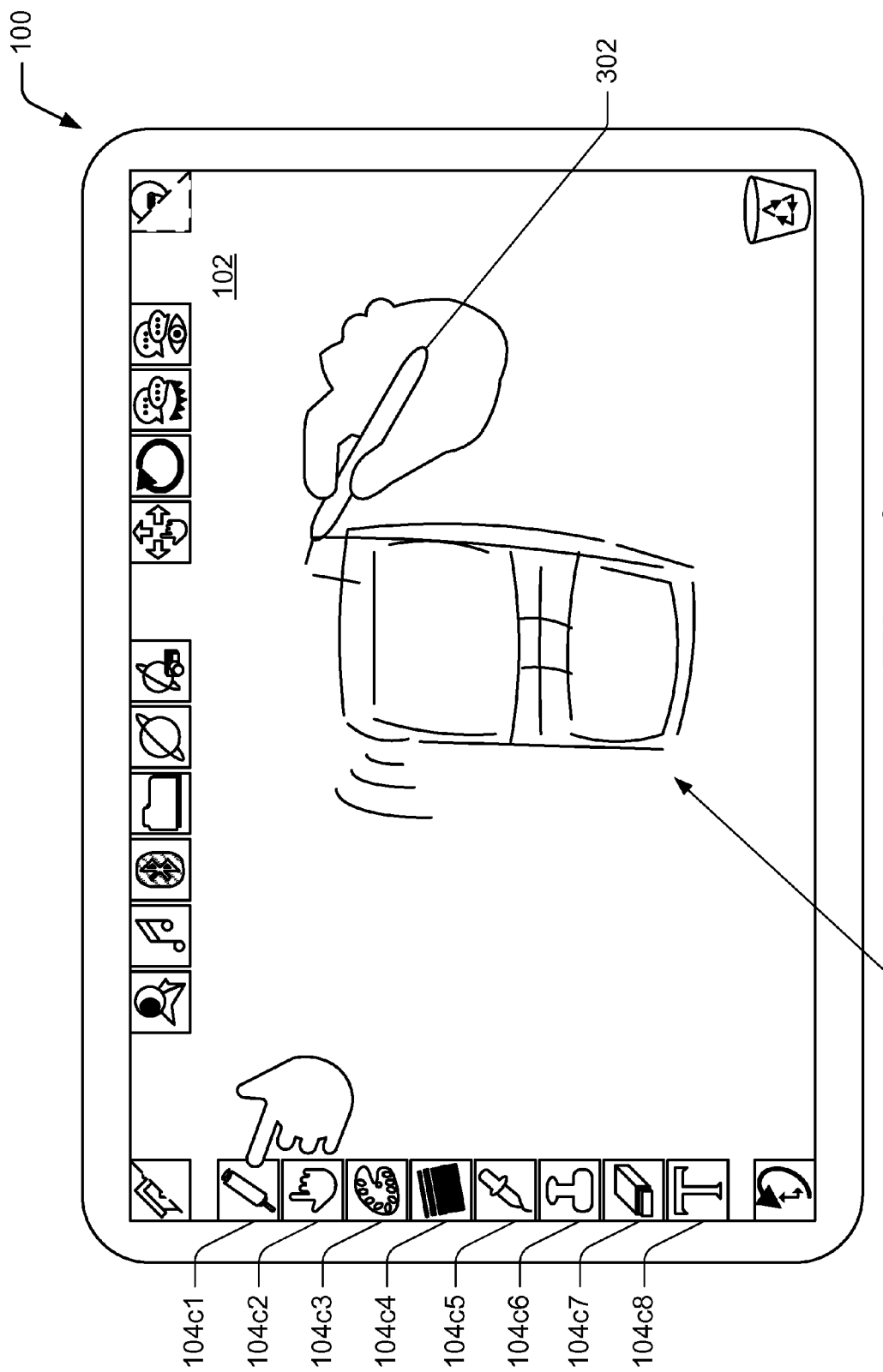
FIG. 3 is a view of an illustrative embodiment of the asynchronous communication system of FIG. 1 with illustrative control options and content displayed.

FIG. 3 shows with illustrative control options and content displayed. The user may create a freehand sketch 300 on the digital canvas 102 with any of the input devices and methods discussed with respect to operation of the interface buttons 104a-g. For example, the user may create a sketch 300 with a pen 302. The sketch 300 may be made with a variety of stroke colors and widths. Some or all of the sketch may be erased and/or redrawn. The desired functionality may be invoked by selection of the respective interface buttons 104a-g. For example, interface buttons 104c1-7 may provide options to sketch, select items, choose colors, choose line thicknesses, sample colors, sample textures, and erase. For example, these functions may be engaged by selecting the associated interface button 104c1-7 after which, the user may draw, erase, sample, select, and/or capture as desired. Additionally the user may insert text boxes into the canvas 102 by selecting interface button 104c8, with which the user may input text using a physical or software keyboard, or through handwriting recognition.

Figure 4:
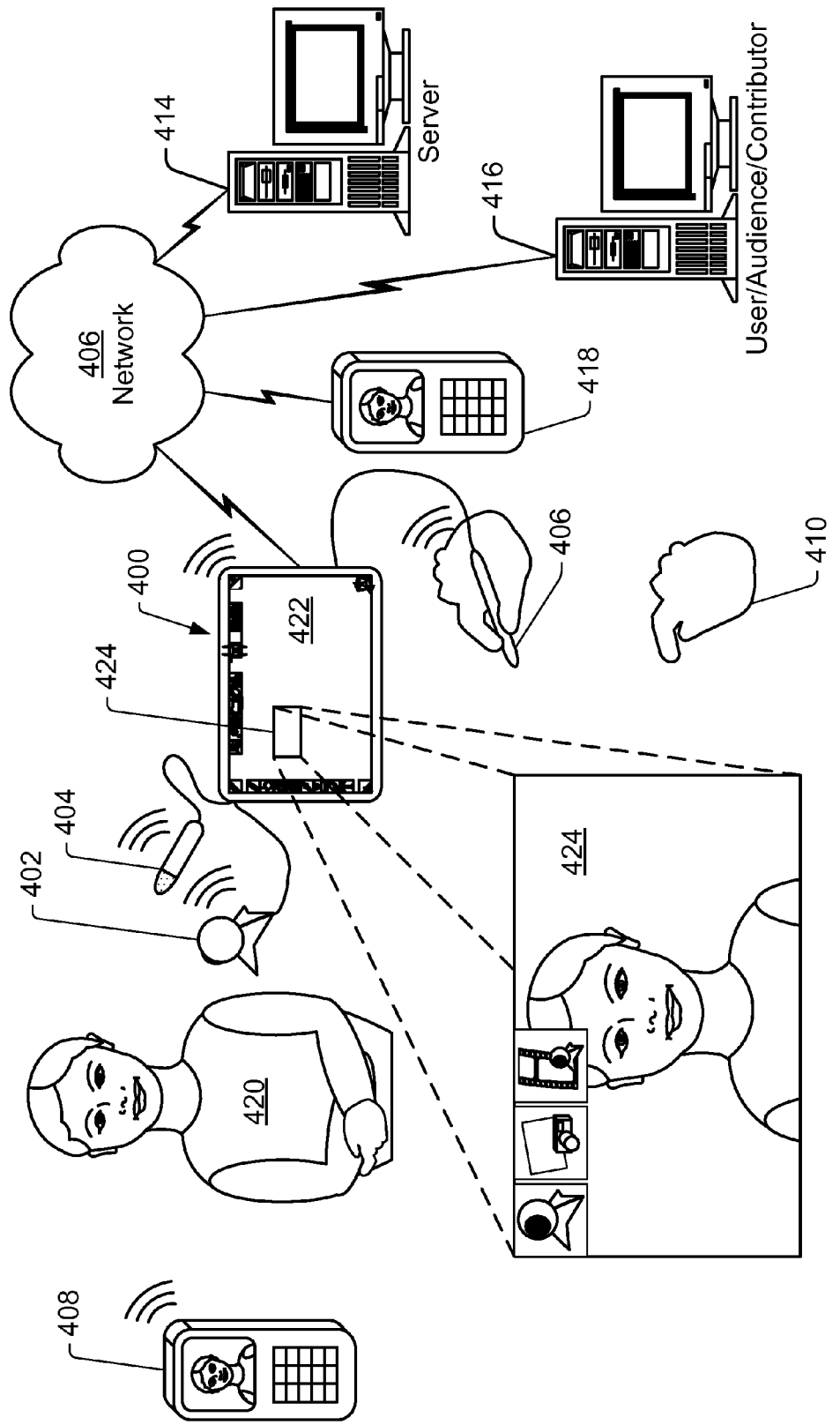
FIG. 4 is a schematic diagram of an illustrative environment where the asynchronous communication system of FIG. 1 may operate.

Capturing Media Content from the Real World. An illustrative embodiment provides capturing content from the real world. The term the "real world" as used herein may include the environment in which the user is situated and by which is surrounded. It may also include an environment distant from the user ranging from just out of the immediate presence of the user, to outside the room, to down the block, to the other side of the world, or to an infinite distance from the user. A plurality of input devices may be used to capture content from the real world, for example, a digital camera, a digital scanner, a microphone, a mouse, a touch pad, a digital pen, and/or a touch screen. FIG. 4 shows an illustrative system where an asynchronous communication system 400 may be connected to the input devices, for example, digital camera 402, microphone 404, pen 406, mobile device 408, and other suitable input devices. A mobile device may comprise any type of mobile telephone, personal digital assistant (PDA), tablet, computing device, for example. They may be connected wirelessly, through wires, or a combination of both. Input to the asynchronous communication system may also be communicated through a touch screen where contact with the pen 406, a user appendage 410, stylus, or other suitable object useable to interface with a touch screen may be sensed. The asynchronous system 400 may also be coupled to a network 406 that may be coupled to a server 414, a user/audience/contributor 416, and a mobile device 418. Any of these connections or associated input devices, among others, may be used to gather and capture content from the real world or other sources. The forgoing are examples of illustrative concepts, but do not indicate required and/or necessary elements.

An embodiment contemplates a software application running on a computing device with both pen and multi-touch input, and connected to a webcam. Some or all of the material created by the user may be stored in a single integrated file, project folder, or a combination of the two, which may be then transferred to an audience through a network including by file sharing, email, instant message, or other channels.

In an embodiment, a user may also capture and insert media content (e.g., image, audio, text, and/or video) from secondary sources. These secondary sources may include, but are not limited to, local data sources, data sources accessible over a network, such as, for example, a server, a user's computer or storage device, an audience's computer or storage device, a contributor's computer or storage device. A computer or storage device may include a personal computer (PC), mobile phone, a personal music player, flash memory drives or cards, or other digital storage devices. For example, content may be gathered from a mobile device through a network. This may allow a user to capture real world content anywhere and at any time, without being constrained to content near the asynchronous communication system. In addition, the user may open an embedded web browser within the asynchronous system, and capture a portion of its content as a snapshot.

For example, in the embodiment of FIG. 4, the digital camera 402 may be a webcam and may have a built-in microphone allowing the user to capture a photo, an audio clip, or a video clip of the real world. The digital camera 402 may be used to take a picture, video, or sound recording of or from subject 420 as seen in FIG. 4. Additionally or alternatively, a cellular phone, personal music player, or other electronic devices have a digital camera that may be used to capture and communicate content from the real world to the asynchronous system 400. For example, mobile device 408 may also take a picture or video of subject 420. This communication may include use of a wireless connection including, but not limited to 802.11 based protocols, Bluetooth®, cellular, infrared, or radio frequency transmission. The content to be captured may be viewed as a live feed displayed on the digital canvas 422 in a view window 424. FIG. 4 also shows an enlargement of view window 424.

Figure 5:
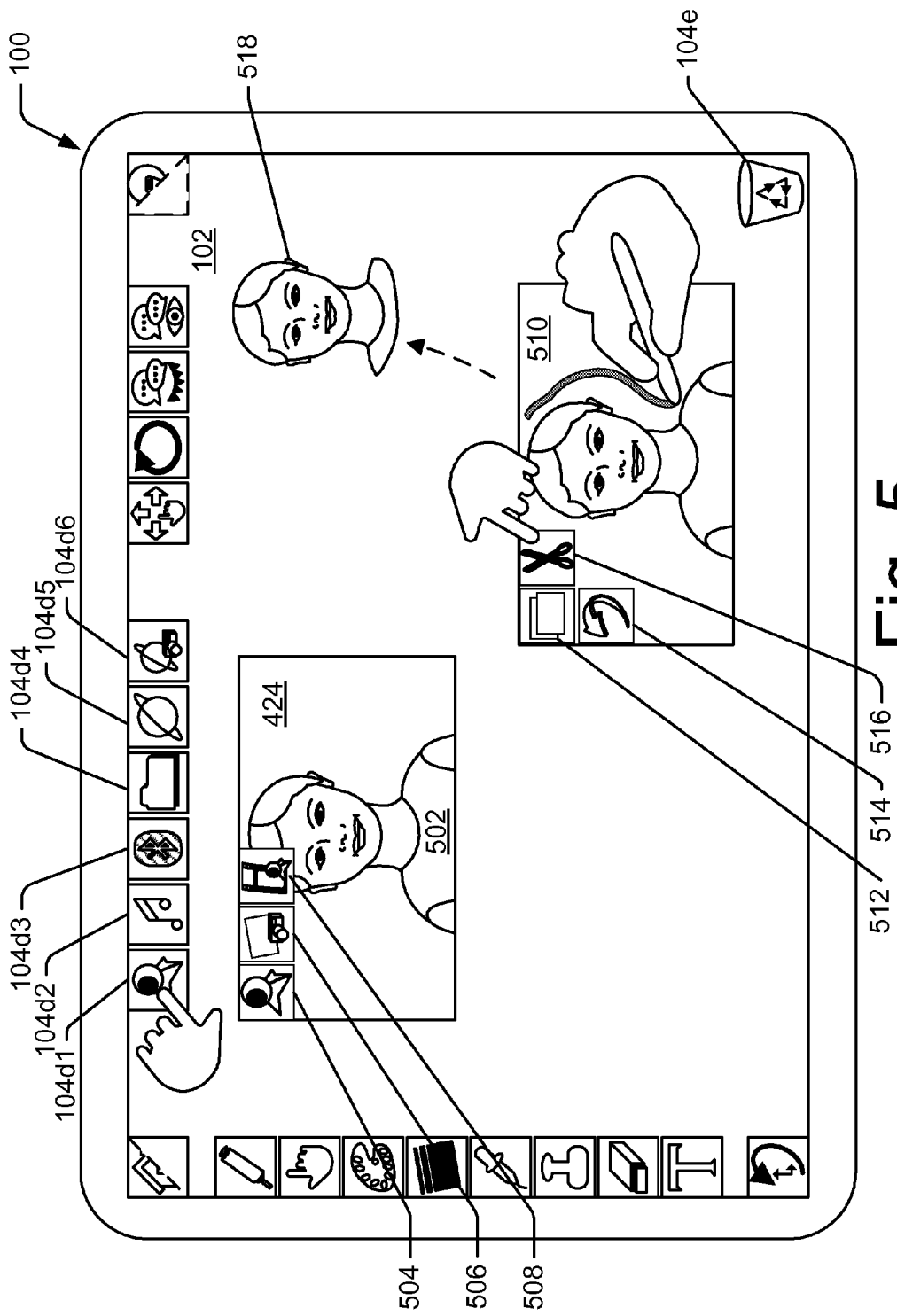
FIG. 5 is another view of an illustrative embodiment of an asynchronous communication system including an illustrative digital canvas with illustrative control options and content displayed.

FIG. 5 shows an illustrative flow of an interface to capture the content from the real world. Asynchronous system 100 may have a digital canvas 102 on which interface buttons 104d provide various options for gathering content from the real world. For example, interface button 104d1 may provide for capture from a digital camera, interface button 104d2 may provide capture from a microphone, interface button 104d3 may provide capture from a Bluetooth® enabled device, interface button 104d4 may provide for capture from a file stored on the device or over a network, interface button 104d5 may provide for capture from an Internet based website, or interface button 104d6 may provide for capture from an Internet based website by taking a screen capture of the page or subsection of the page.

An example of the flow of a capture of content may be by selection of interface button 104d1 that may cause view window 424 to appear or become active. Selection may be by touch of a finger, pen, stylus, mouse, keyboard selection, or other suitable method. View window 424 may comprise a live image 502 of the content to be captured, along with interface buttons 504, 506, and 508. Selection of interface button 504 may make the view window 424 active if at any point, the view window 424 becomes inactive or to select view window 424 for resizing or translation with respect to the digital canvas. Selection of interface button 506 may cause a still capture window 510 to be generated. The content of the still capture window 510 may be substantially a copy of the contents of the view window 424 at the time of the selection. For example, activating interface button 506 may be analogous to pressing the shutter button of a digital camera while taking a digital photograph. Capture window 510 may also comprise interface buttons 512, 514, and 516. Selection of interface button 512 may cause still capture window 510 to become an active and selectable window. Selection of interface button 514 may cause the preceding act or modification to be undone. Selection of interface button 516 may cause an editing feature to become active, for example, cropping.

Figure 6:
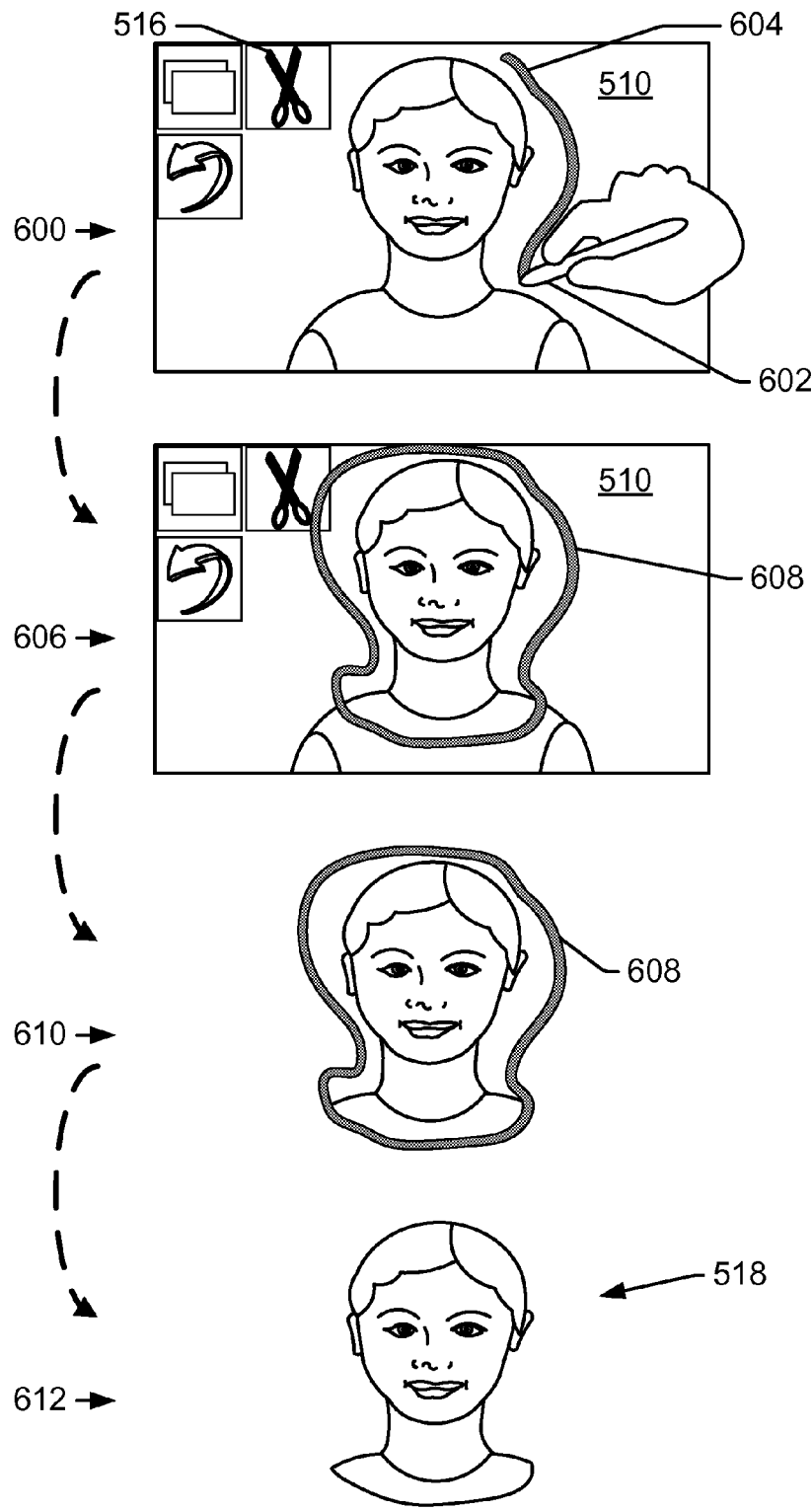
FIG. 6 is a view of an illustrative embodiment of a content modification flow.

FIG. 6 shows an illustrative example of a cropping procedure with the digital canvas not shown for simplicity. For example, at operation 600, capture window 510 appears after interface button 516 has been selected. This selection may allow a user to use a pen 602, stylus, finger, or other suitable device to designate a cropping border 604. Operation 606 shows a capture window 510 where the user has created a closed cropping border 608 by completing the cropping border 604. This completion may cause the contents of the capture window 510 outside of the closed cropping border 608 to disappear as illustrated at operation 610. As shown at operation 612, the closed cropping border 608 may then disappear leaving a cropped image of the captured content 518.

Returning to FIG. 5, the captured content 518 may then appear on the digital canvas 102, and may be freely manipulated using, for example, single- or multi-touch finger gestures (moving, rotating, scaling) to be positioned together with hand drawn sketches. Dragging the content into a trashcan or recycling bin 104e that may be located at the bottom right corner of the screen may delete or remove it.

Similar to the procedure used to capture the still image, video may also be captured. For example, interface button 508 may be selected causing a capture window similar to capture window 510 to appear and being recording a video corresponding to the contents of the view window 502.

Figure 7:
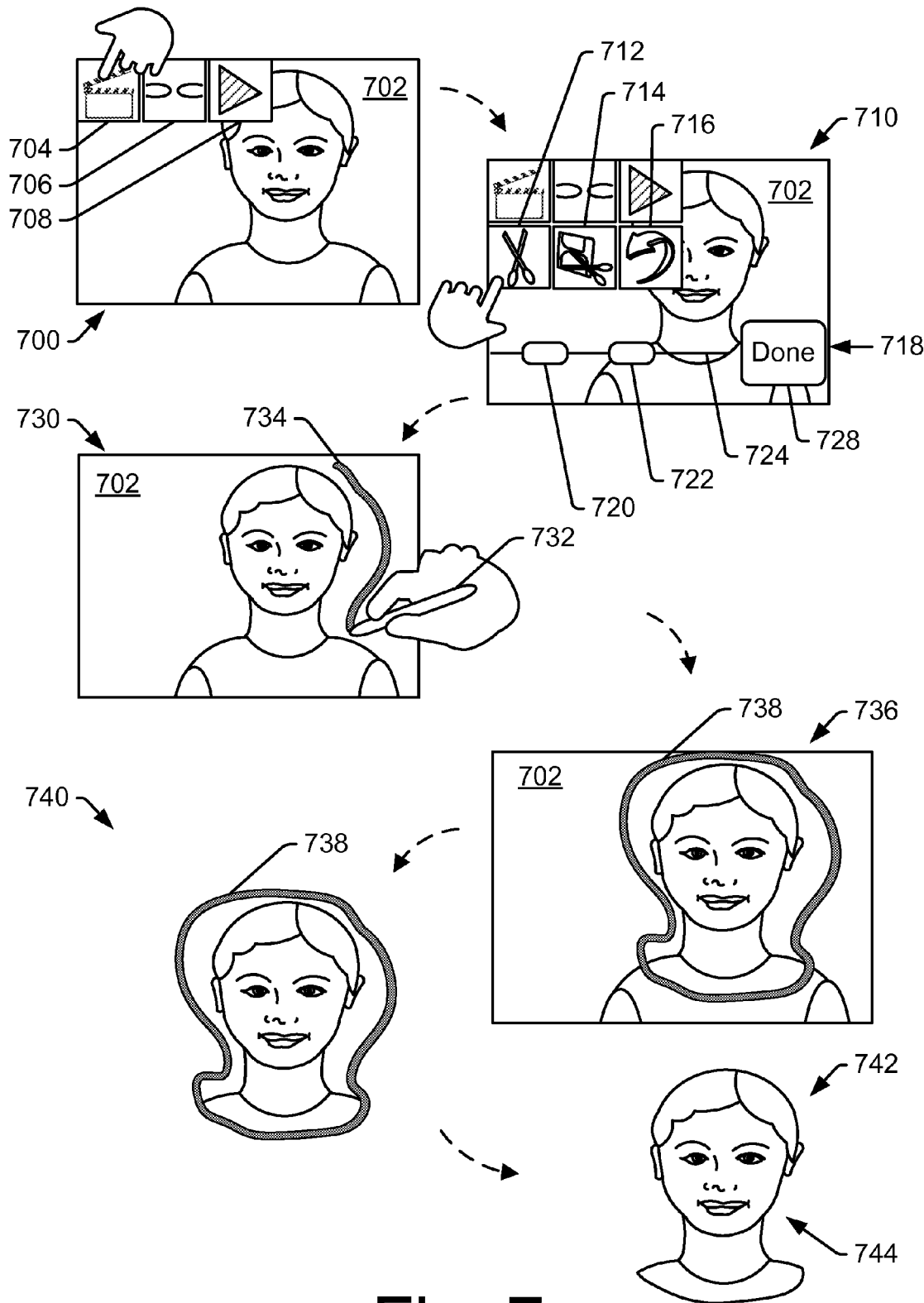
FIG. 7 is a view of an illustrative embodiment of a content modification flow.

After the recording of the video is complete, the video may also be cropped. FIG. 7 shows an illustrative example of a cropping procedure with the digital canvas not shown for simplicity. For example, at operation 700, capture window 702 appears after video has been recorded. Capture window may comprise interface buttons 704, 706, and 708. A user may select interface button 704 to cause additional options to appear. For example, at operation 710, capture window 702 may display additional interface buttons 712, 714, and 716 that may allow access to additional functionality. Additionally, interface control 718 may also be displayed comprising two markers 720 and 722 along a line 724 with an interface button 728. Use of interface control 718 may provide for an interface for a user to control the start, end, and length of the video. For example, if the length of line 724 is representative of the total length of the video recording, then a user may slide marker 720 to a point along line 724 associated with where the user would like the video to begin playing. For example, if the user wants the video to begin playing at the beginning of the video as it was recorded, then the user may slide marker 720 to the left most end of line 724. Similarly, if the user wants the video to begin approximately halfway through the recorded video, the user may move marker 720 to approximately the middle of line 724. Similarly, the user may move marker 722 to designate when the video should stop playing by moving marker 722 to the associated position along line 724.

Further, selection of interface button 712 may also provide for a cropping of the video. For example, operation 730 shows a user using a pen 732 to designate a cropping border 734. Operation 736 shows a capture window 702 where the user has created a closed cropping border 738 by completing the cropping border 734. This completion may cause the contents of the capture window 702 outside of the closed cropping border 738 to disappear as illustrated at operation 740. As shown at operation 741, the closed cropping border 738 may then disappear leaving a cropped video of the captured content 744.

Figure 9:
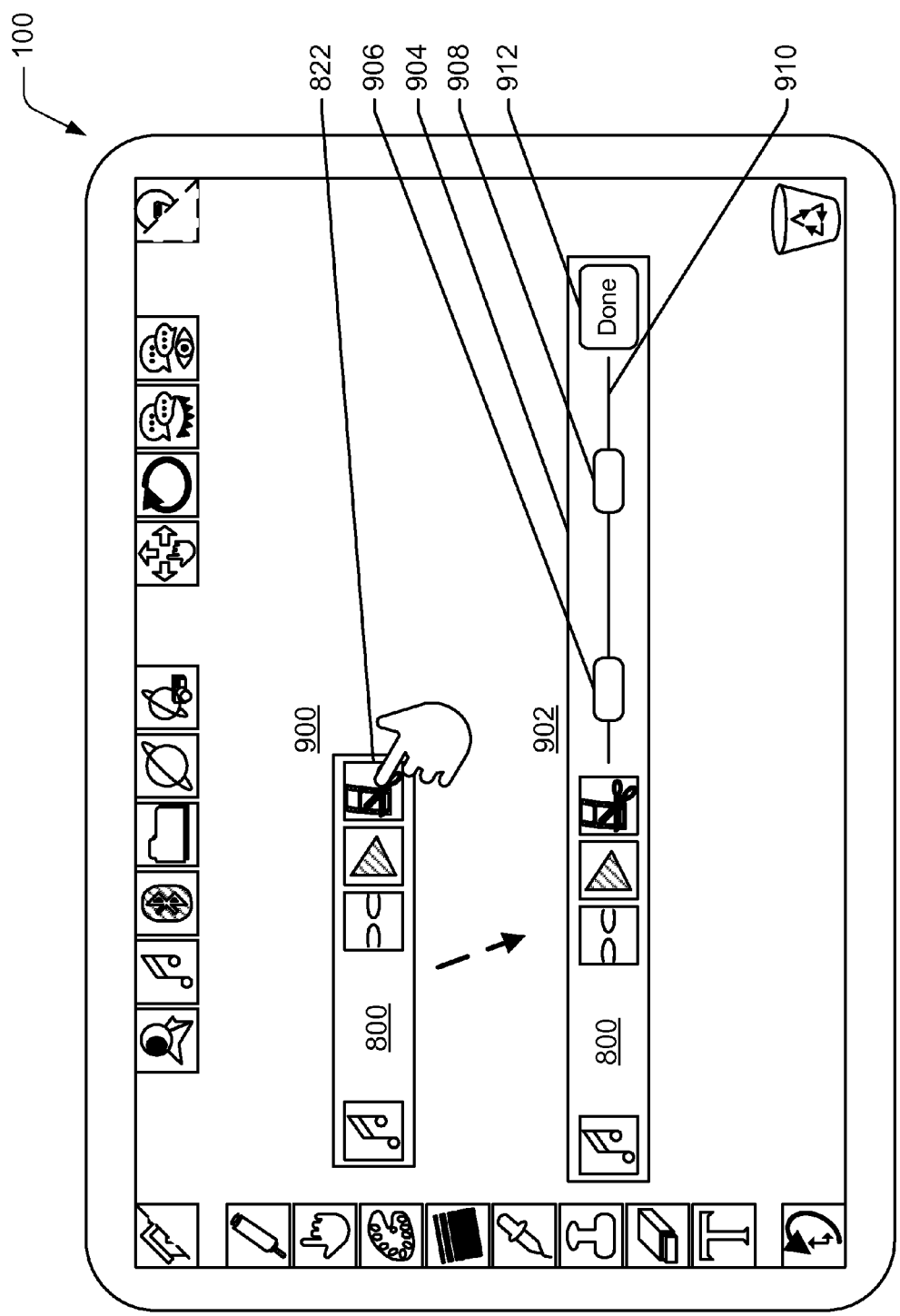
FIG. 9 is a view of an illustrative embodiment of a content modification flow.

Additionally, audio may be captured with or without video. For example, interface button 104d2 may be selected to initiate an audio capture window 800. The audio capture window may comprise various interface buttons including interface buttons 802, 804, and 806 allowing for capture of audio. Selection of interface button 802 may cause the audio capture window 800 to become active. The displayed interface buttons may change depending on the state of the audio capture window 800 and the stage of audio acquisition. For example, a user may select interface button 806 as shown at operation 808. Recording of the audio channel may then begin as indicated by appearance of interface button 810 or the change in appearance of interface button 808 as shown at operation 812. To end the recording, the user may select interface button 810 that may cause the appearance of the audio capture window to change as seen at operation 814 showing an interface button 816 replacing or changing the appearance of interface button 810. Selecting interface button 816 may cause the audio recording to play allowing the user to review the recording where a user may pause the playback by selecting interface button 820. Further, a user may desire to edit the audio recording by, for example, selecting interface button 822. FIG. 9 shows an example where a user selects interface button 822 shown on the audio capture window 800 at operation 900. This may cause the audio capture window 800, as seen at operation 902, to display an interface control 904. Interface control 904 may comprise two markers 906 and 908 along a line 910 with an interface button 912. Use of interface control 904 may provide for an interface for a user to control the start, end, and length of the audio recording. For example, if the length of line 910 is representative of the total length of the audio recording, then a user may slide marker 906 to a point along line 910 associated with where the user would like the audio recording to begin playing. For example, if the user wants the audio recording to begin playing at the beginning of the recording, then the user may slide marker 906 to the left most end of line 910. Similarly, if the user wants the recording to begin approximately halfway through the recording, the user may move marker 906 to approximately the middle of line 910. Similarly, the user may move marker 908 to designate when the recording should end playing by moving marker 908 to the associated position along line 910.

Accordingly, both photos and video clips may be cropped to arbitrary shapes using the pen to show only the region of interest, and both audio and video clips may be trimmed in time using a pair of slider knobs or markers to keep only the segment of interest. The audio and video clips may then be played in place. In the case of capturing a photo or a video clip, a live on-screen viewfinder may be displayed on the digital canvas to facilitate framing. Similar to captured content, the viewfinder can also be manipulated using finger gestures or other user inputs. These capturing functions allow the designer to easily make references to the real world, or incorporate personal remarks.

In addition, the user may open an embedded web browser within the asynchronous system, and capture a portion of its content as a snapshot. For example, a user may select interface button 104d5 as seen in FIG. 1 to initiate a web browsing session. A user may then select interface button 104d6 to initiate a capture and modification of the displayed web browser content similar to the capture and modification of a captured image discussed with reference to FIGS. 5 and 6.

Often, designers in face-to-face communication explain verbally while they are sketching. This may be an example of multimodal communication. In one embodiment, as the user captures an audio or video clip, he or she may select an interface button to link the clip with the sketch. This may allow the user to sketch at the same time and have the sketch strokes recorded together with the clip.

Figure 10:
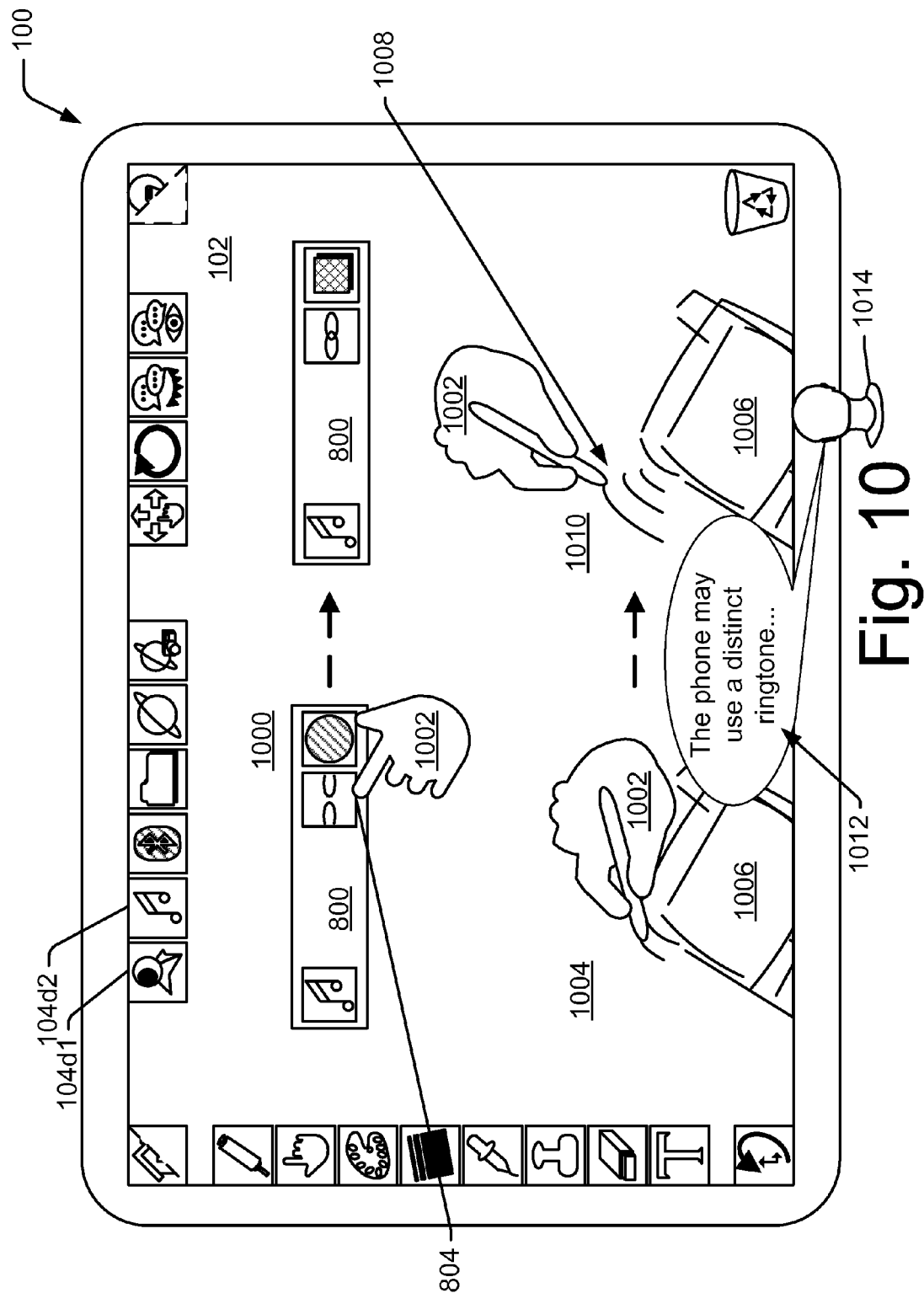
FIG. 10 is a view of an illustrative embodiment of a content capture flow.

An example of this embodiment may be seen in FIG. 10 showing, for example, audio capture window 800 at operation 1000. A user 1002 may select interface button 804 to link the audio recording to the sketch created at operation 1004. In the depicted example, the entire sketch need not be drawn at the time of linking. Rather the pre-existing portion of the sketch 1006 may appear as already drawn and only the portions added by the user 1002 may be linked. For example, the additional lines 1008 may be added by the user 1002 as shown at operation 1010. While the user 1002 is drawing lines 1008, the statements 1012 of a speaker 1014 may be recorded. The speaker 1014 may be the same person as the user 1002, or may be someone different. The statements 1012 recorded may be speech, sound effects, music, or any other noise the user may desire to capture and link to the sketch. Similarly, a video may be recorded and linked by a user selecting interface button 104d1 and selecting the interface button 706 as shown in FIG. 7.

Accordingly, when playing back the recorded clip, the sketches may be re-drawn in synchronization. For example, when replayed, the example shown in FIG. 10 would cause the additional lines 1008 to appear in order as they were drawn while the recorded voice recites that "the phone may use a distinct ringtone . . . " This simple example may allow a user to communicate to an audience that the distinct ringtone emanates from the cellular phone. This may allow a user and an audience to emulate the above practice used in face-to-face settings.

Figure 11:
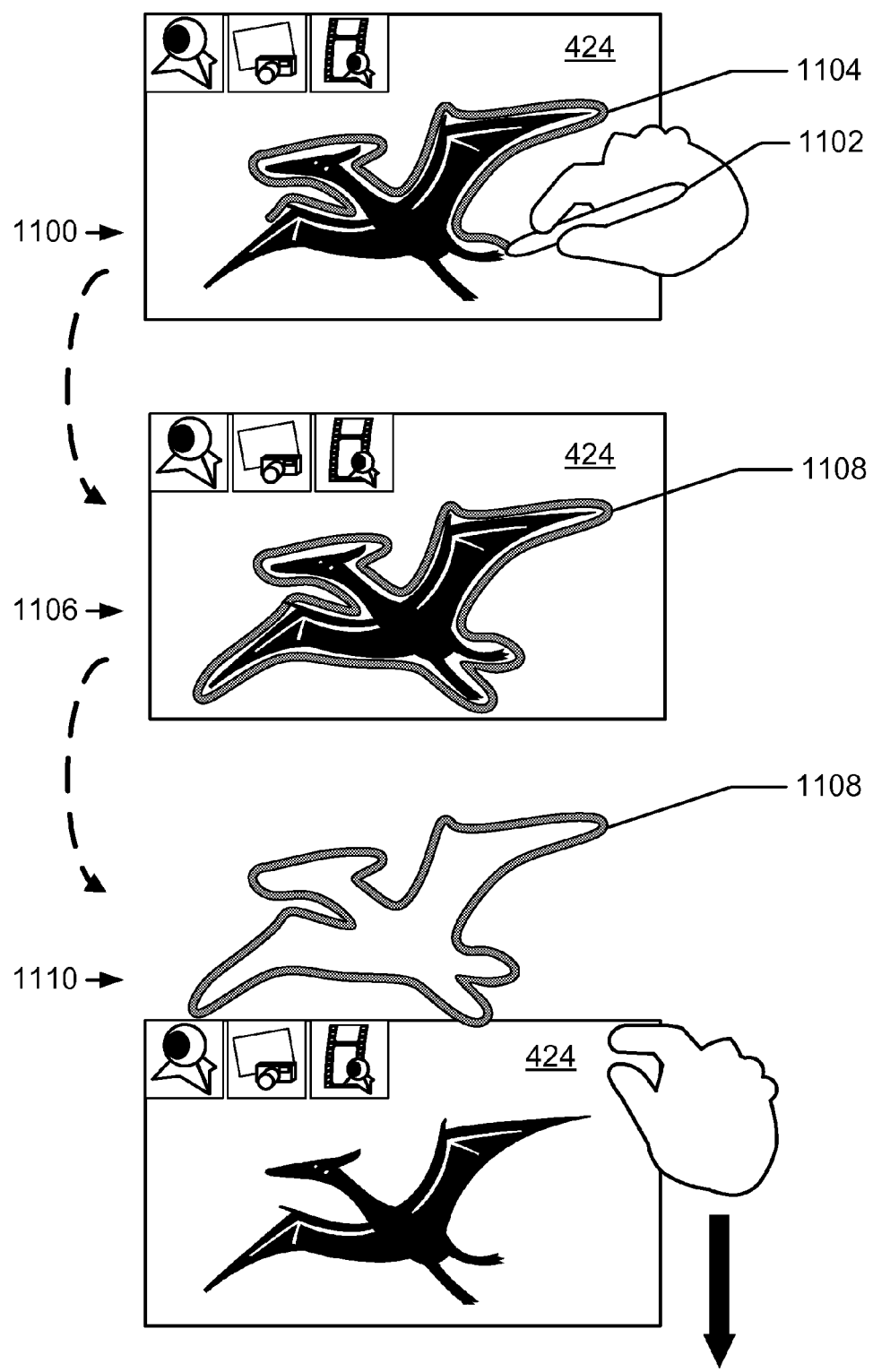
FIG. 11 is a view of an illustrative embodiment of a content capture flow.

Another embodiment may provide for a user to quickly and efficiently capture a shape of a real world object. For example, a user may select interface button 104d1 to cause the view window 424 to appear or become active as discussed with regard to capture of a still image or video with reference to FIG. 5. Here, a user may select interface button 104c1 and using a finger, pen, stylus, mouse, or other suitable input device, the user may trace over the desired features shown in the view window 424. For example, FIG. 11 shows an illustrative example of a shape capture procedure with the digital canvas not shown for simplicity. For example, at operation 1100, view window 424 appears after interface button 104c1 has been selected. This selection may allow a user to use a pen 1102 or other input device to designate a tracing line 1104. Operation 1106 shows the view window 424 where the user has created a completed tracing line 1108 by completing the tracing line 1104. The user may then choose to move the view window away from the completed tracing line 1108 as seen at operation 1110. Additionally, a user may decide to move the completed tracing line 1108 away from the view window 424. The user may also keep the completed tracing line 1108 over the view window 424 to aid in a use of the tool including, but not limited to, superposition of captured elements, measurements of viewed objects, comparisons of shapes or features of viewed objects, or other uses that may aid in the communication of contextual information. Additionally, the user may capture a live image as discussed above and use that image in place of the view window 424. This may allow the user to more accurately depict certain objects when desired, or simply to complement his or her freehand sketching skills.

Figure 12:
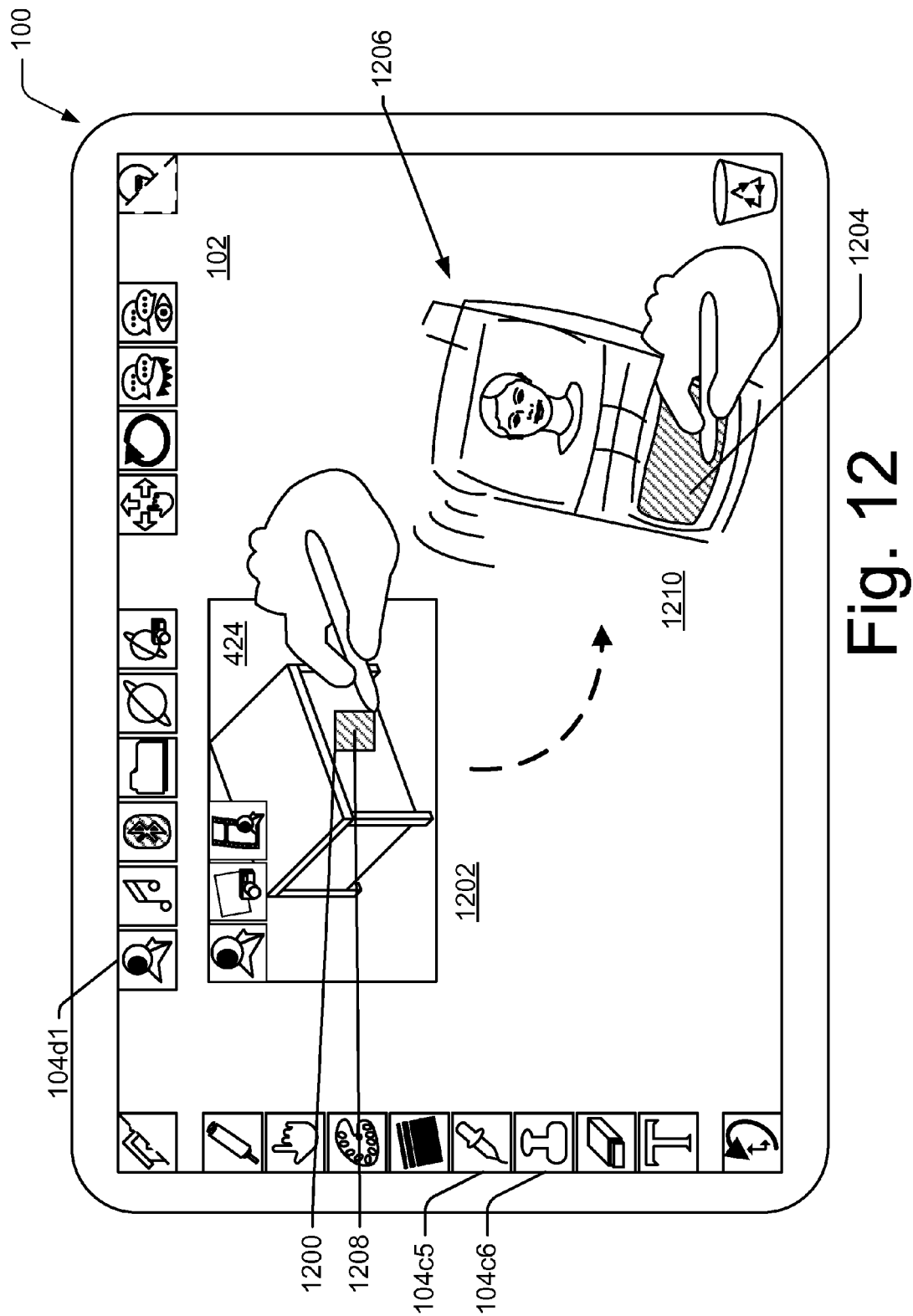
FIG. 12 is a view of an illustrative embodiment of a content capture flow.

Borrowing Sketching Elements from the Real World. In an embodiment, a user may sample attributes of the real world to be used in his or her asynchronous communications. For example, a user may want to use a color or a texture from the real world in his or her sketches. FIG. 12 shows an illustrative implementation of this feature. A user may select interface button 104d1 to activate view window 424. The user may then select interface button 104c6 to sample a texture. The user may then designate a selection area 1200 shown at operation 1202 thereby sampling the texture of the image in the view window 424 within the selection area 1200. Additionally, or alternatively, the user may designate a selection area on the screen including anywhere on the digital canvas 102, the view window 424, or other visible items. The selection area 1200 may be designated by any suitable means including, without limitation, a pen, a finger, a stylus, or mouse. The selection area 1200 may take various shapes including, but not limited to, circles, ovals, rectangles, squares, triangles, polygons, and free form shapes. The texture may also be sampled from a captured image, video, or other digitally accessible source.

The user may then designate a portion 1204 of a sketch 1206 to add the captured texture 1208 as seen at operation 1210. For example, the user may use the texture to paint freely, fill a region, and/or create a shape as ways of designation. In one embodiment the captured texture 1208 may be sized to substantially fill the portion 1204. This may include enlarging or reducing the captured texture 1208. This may also mean distorting the captured texture 1208, for example by changing the ratio of the height and width of the captured texture 1208 as defined by the selection area. Another embodiment may provide that the captured texture 1208 be enlarged to be large enough to fully cover the portion 1204 with the captured texture 1208 and the areas of the captured texture 1208 outside the portion 1204 are cropped. This approach may be useful when the portion 1204 takes the shape of a free form or shape that is substantially different from the shape of the selection area 1200. Another embodiment may provide for the captured texture 1208 to be repeated as a pattern sufficient to fill the portion 1204.

To sample a color, a user may select interface button 104c5 and designate a point on the screen including anywhere on the digital canvas 102, the view window 424, or other visible items. The user may then designate an area of a sketch to be filled in with the color, or the user may draw lines or shapes where the lines or shapes are of the captured color.

Multimodal Annotations. Often, annotations are a constituent in hand-drawn design sketches. Designers may use them to communicate additional information regarding specific components of the sketch. The annotation may be indicated by visual marks such as callouts and bubbles. With the ability to capture multimodal content, richer, and more vivid annotations can be supported. Although it may be possible to simply combine hand drawn marks with captured media to indicate an annotation, for example, placing an audio clip in a hand drawn callout bubble on the canvas, this solution likely becomes infeasible and ineffective as the number of annotations increases. The canvas may likely be taken up by annotations, leading to visual clutter (caused by both the annotations themselves and callout marks), less space for the original sketch, and eventually confusion of an audience and possibly the designer himself or herself. This may be a common challenge in paper sketches, and may be further aggravated in digital sketches given that multimodal annotations such as photos or videos often need to take up considerable screen space to be displayed in order to be effectively viewed.

Various embodiments may provide an annotation mechanism that may be considered by users to be lightweight, flexible, unambiguous, and scalable. In one embodiment, the user may use a single finger to indicate a canvas region that he or she wants to annotate, by either circling the region of interest, or alternatively dwelling the finger on the screen when the region of interest is a single point. A user may also indicate a canvas region using other input methods including, but not limited to, the use of a pen, stylus, mouse, keyboard, trackball, touchpad, or other suitable actions. One embodiment provides that the annotation function is available by default when the system detects a single finger on the touch screen interface in the digital canvas and not above an interface button. This single finger touch may be recognized by the system as different from a multi-touch by a user that may cause the system to zoom in or out, pan left, right, up, or down, or move or resize a feature displayed on the digital canvas. Other embodiments may provide a designated interface, for example an interface button, enabling the annotation feature.

Figure 13:
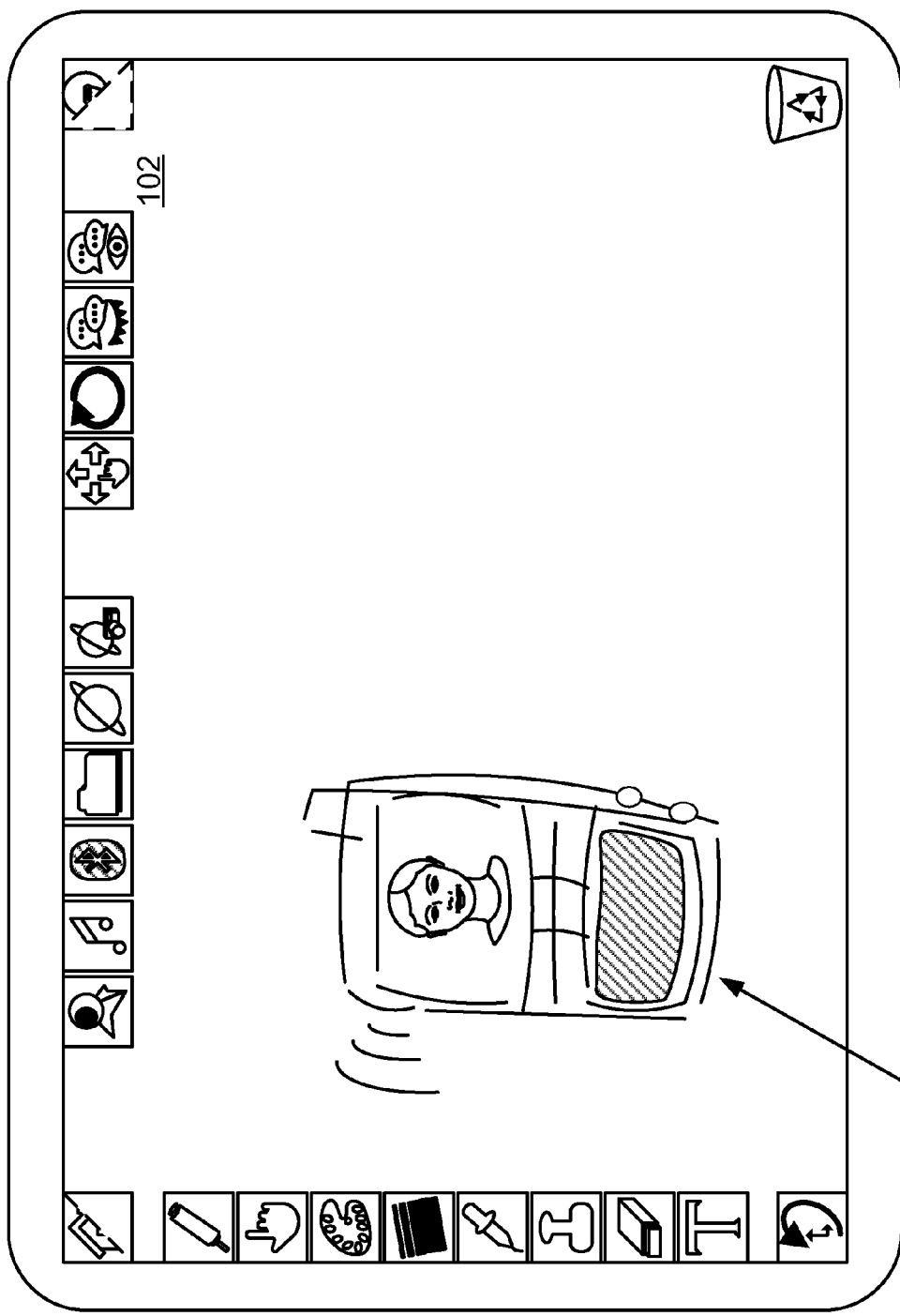
FIGS. 13-22 are views of an illustrative embodiment of an asynchronous communication technique through annotation.
Figure 14:
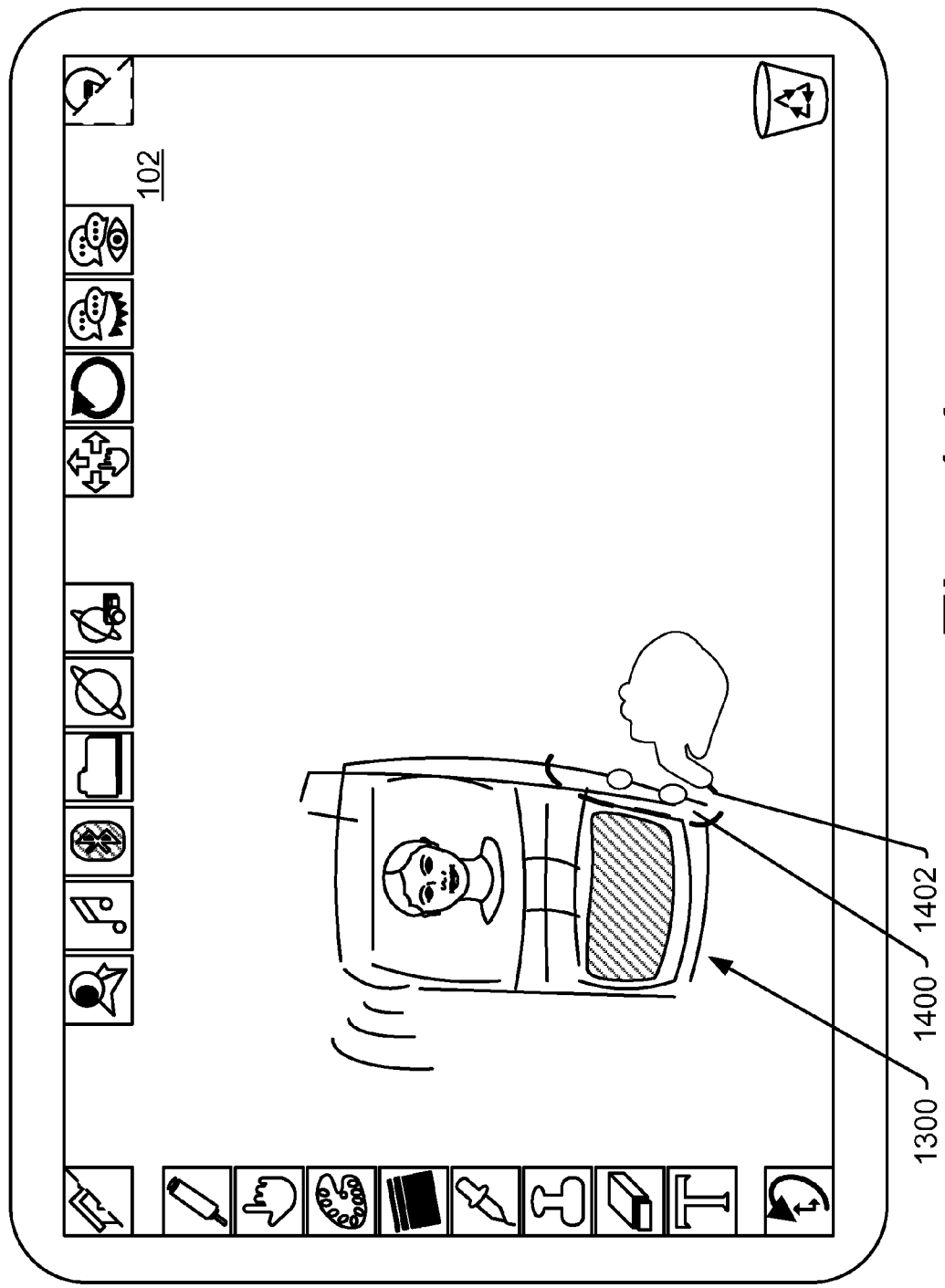
Figure 15:
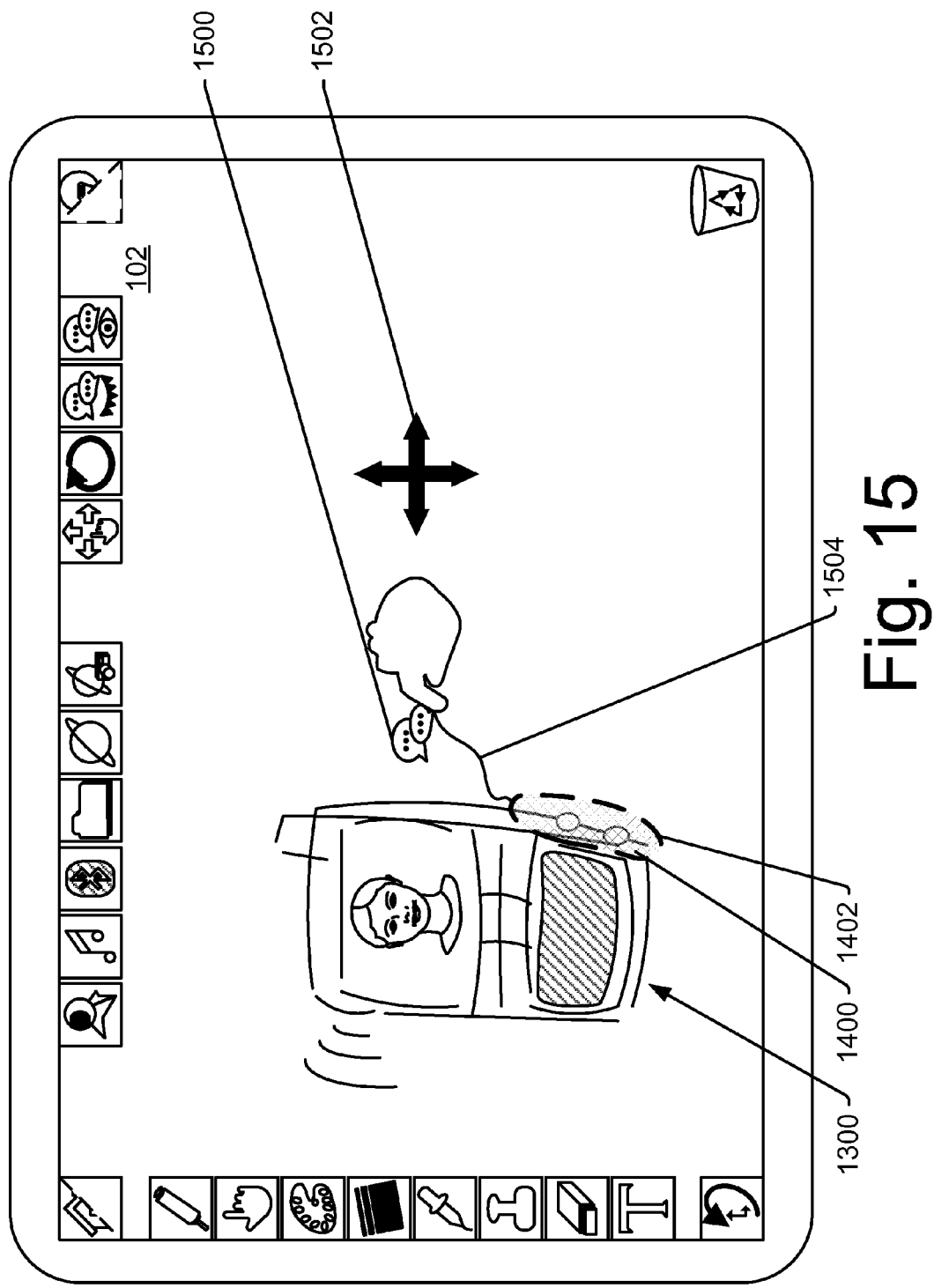

FIGS. 13-22 show an illustrative example of an annotation scheme. FIG. 13 shows an example of a sketch 1300 that a user may annotate. FIG. 14 shows a user indicating an area or region 1400 to annotate, by moving his or her finger around a region defining path 1402. Additionally, the user may dwell his or her finger at a location to designate a point or an effectively smaller region to annotate.

Figure 16:
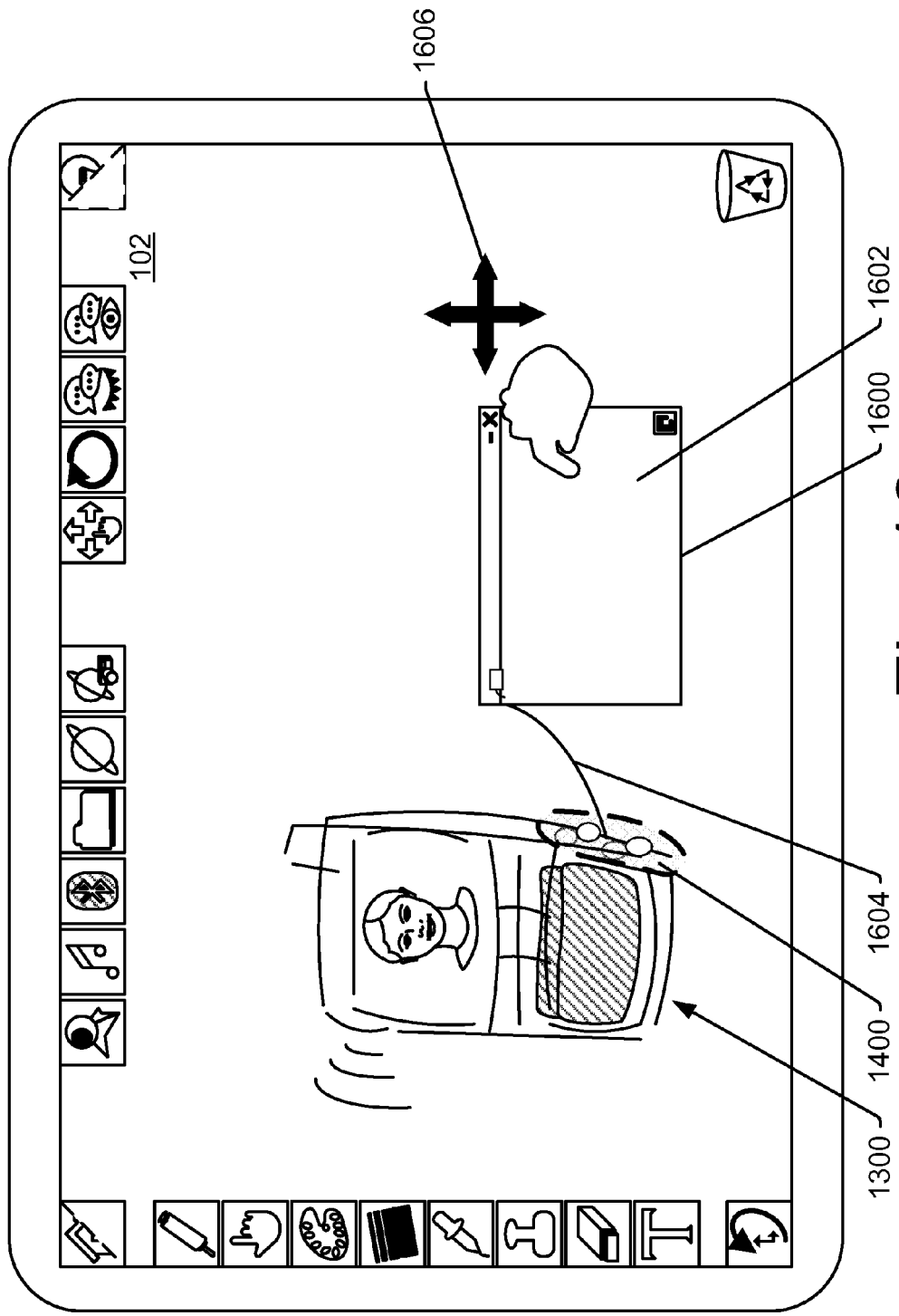

Once the system detects an indication, whether it is a region defining path in the shape of a circle or other shape, or a dwell, an annotation icon 1500 appears near the finger and follows the finger movement on the digital canvas 102. The designer can then move the icon 1500 to where they wish the annotation to appear. The movement may be in any direction as suggested by the movement arrows 1502. A reference line 1504 may be displayed substantially marking the path the user's finger took from completing the region defining path 1402 to the current location of the annotation icon 1500. An annotation panel 1600 may appear once the user releases the finger as shown in FIG. 16. The annotation panel 1600 may be in various geometric shapes including, but not limited to, rectangular, square, circular, oval, trapezoidal, or other geometric shape including freeform shapes. The annotation panel 1600 may comprise an annotation canvas 1602, similar in capabilities to the digital canvas 102 as discussed. The user may sketch in the panel 1600 on the annotation canvas 1602 or add content to the annotation canvas 1602 from the digital canvas 102 by dragging any type of content, for example, photos, audio or video clips, from the digital canvas 102 or another annotation canvas into the annotation canvas 1602. This also provides for the possibility of nested annotation canvases within annotation canvases.

The annotation panel 1600 may be connected to the annotated region 1400 through a line 1604. The line 1604 may be a curved or straight line. The line may connect a corner of the annotation panel 1600 adjacent to the annotated region 1400. The line 1604 may be connected to the annotated region 1400 at any point within the annotated region 1400 or along the annotated region boundary. Additionally, the line 1604 may not be directly connected to, but may terminate near the boundary of the annotated region 1400. Additionally, the line 1604 may have an indicator, including, but not limited to, an arrow pointing to the annotated region 1400. One embodiment contemplates that the line 1604 may terminate substantially near the center of the annotated region 1400. This center may be calculated or approximated in various known ways.

The annotated region 1400 may be displayed or visualized by an indicator. One embodiment contemplates the indicator as a translucent halo. The translucent halo may comprise a border having a first opacity and an area defined by the border having a second opacity. A halo effect may be established by the first opacity being greater than, or more opaque than, the second opacity relative to each other. Using the second opacity as a reference, the opacity of the halo may be inversely proportional to its area. Stated another way, the transparency of the halo may be proportional to the area of the halo. Additionally, or alternatively, the first opacity and the second opacity may have the same opacity such that the border is indistinguishable from the area defined by the border. Further, the border may have a consistent opacity regardless of the area it defines, it may be completely translucent, and/or it may not be displayed. The foregoing approaches may allow smaller annotated regions to appear more prominent than larger ones, allowing each to be easily distinguishable from each other in the case of nested or overlapping annotated regions. Various embodiments may provide the opacity to be related to the length of the halo perimeter. Various embodiments may provide that each annotated region is automatically assigned a color code upon creation. This color code may also be reflected by the associated panel, the halo, and the connection line.

Figure 17:
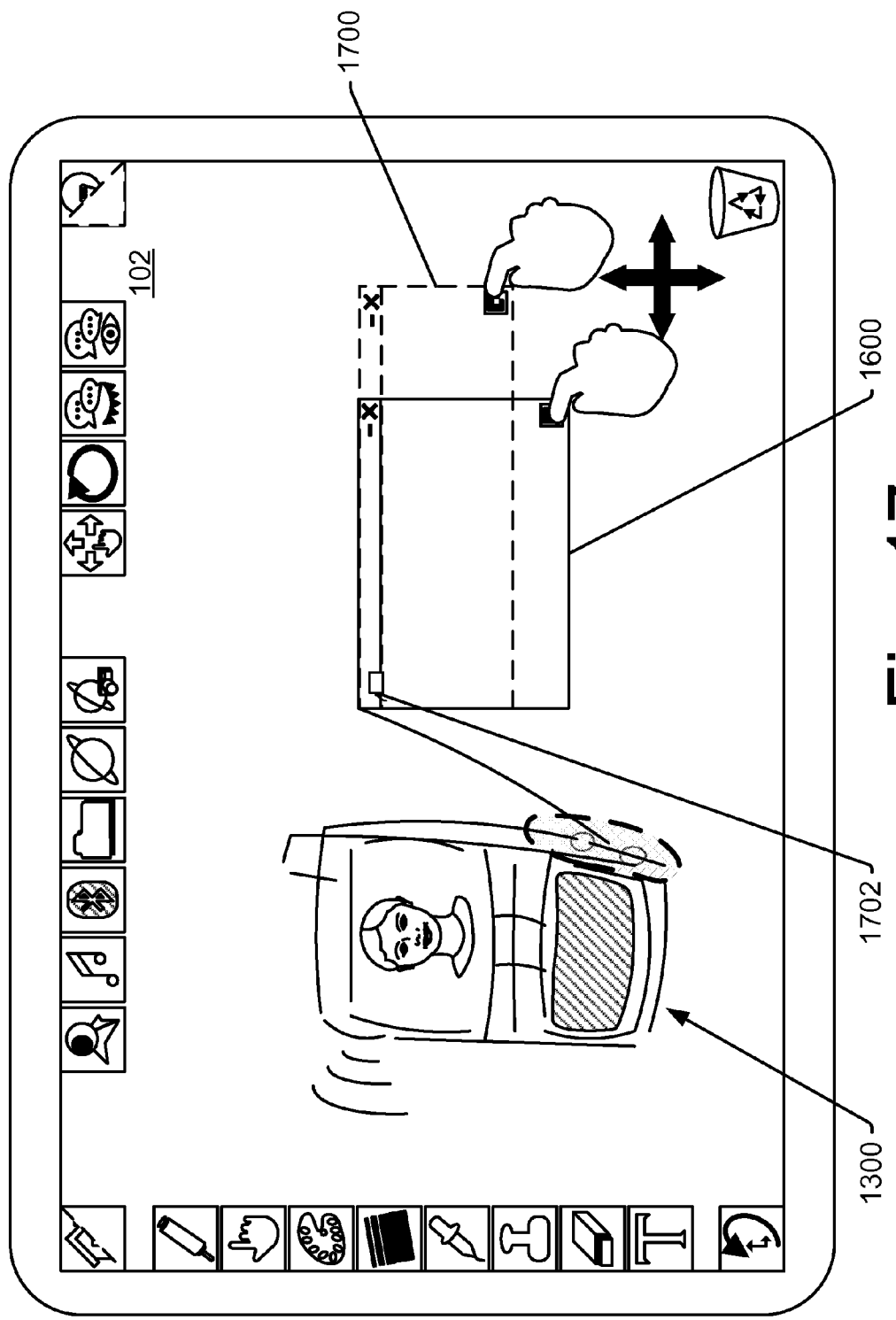
Figure 18:
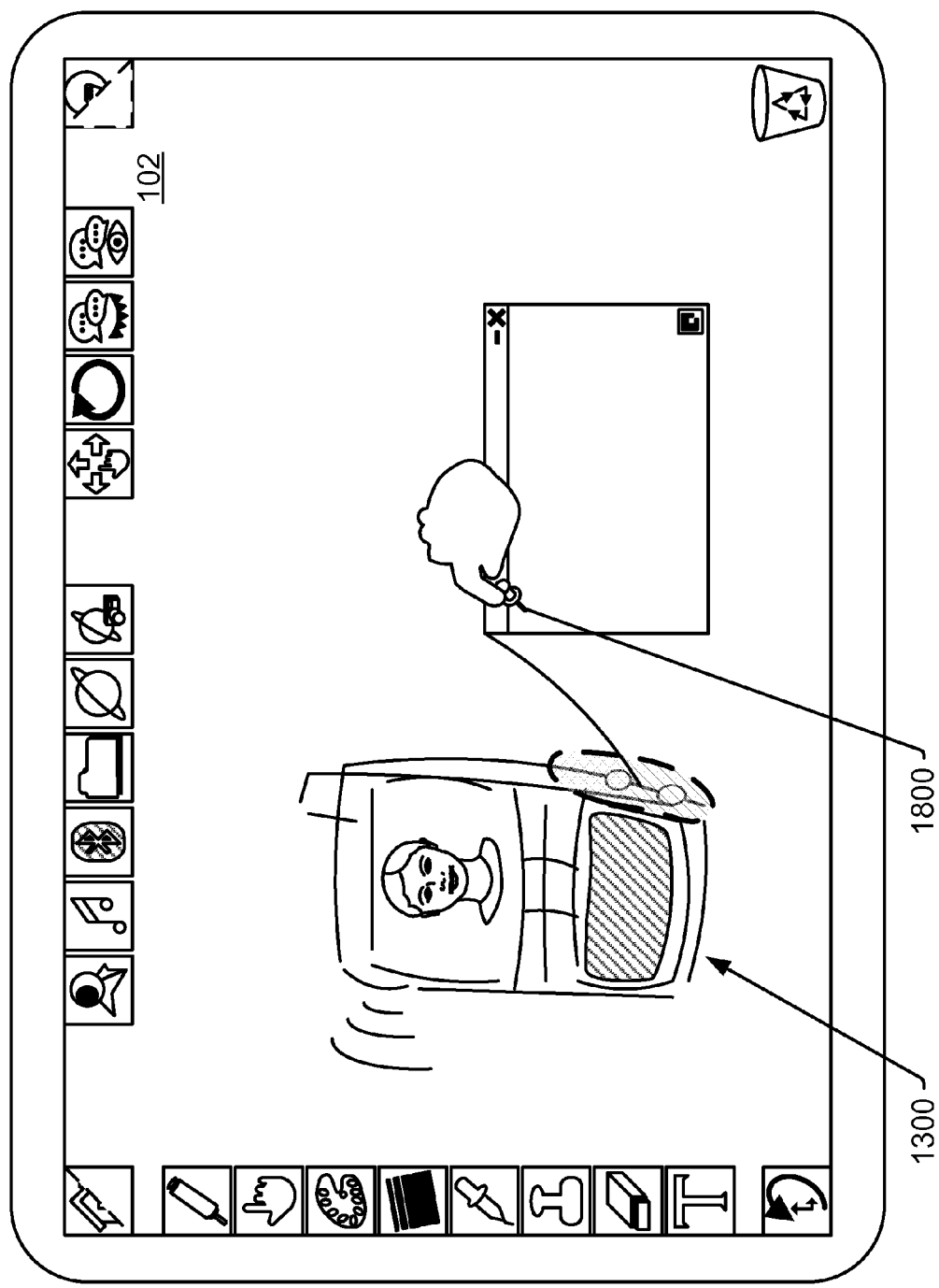

The annotation panel 1600 may be moved to any location on the digital canvas by dragging by the user as seen in FIG. 16 and indicated by the movement arrows 1606. The annotation panel 1600 may be resized to any size or shape. In one embodiment, the annotation panel 1600 may be resized by touching the lower right portion of the annotation panel 1600 and moving the touched region in the desired direction to resize. For example, FIG. 17 shows a user touching the annotation panel 1600 and changing the shape to an alternate shape 1700.

A user may set an annotation panel to be floating or fixed. A floating panel may be freely moved and resized using the finger or other suitable techniques, while a fixed panel remains static. The floating panel may be useful when the use lays out multiple annotations or wants to avoid occluding content on the digital canvas. The fixed annotation panel may be suited for annotations whose meaning is dependent on their positions relative to the sketch, for example, length markings.

An embodiment contemplates that a user may toggle between the floating and fixed state by selecting an icon associated with the annotation panel. For example, a user may select the floating icon 1702 as shown in FIG. 17 to toggle it to a fixed icon 1800 shown in FIG. 18. The fixed icon 1800 may indicate to a user that the annotation is fixed and not floating. To change the state back to floating, the user may select the fixed icon 1800 to return the annotation panel to a floating state indicated by floating icon 1702.

Figure 19:
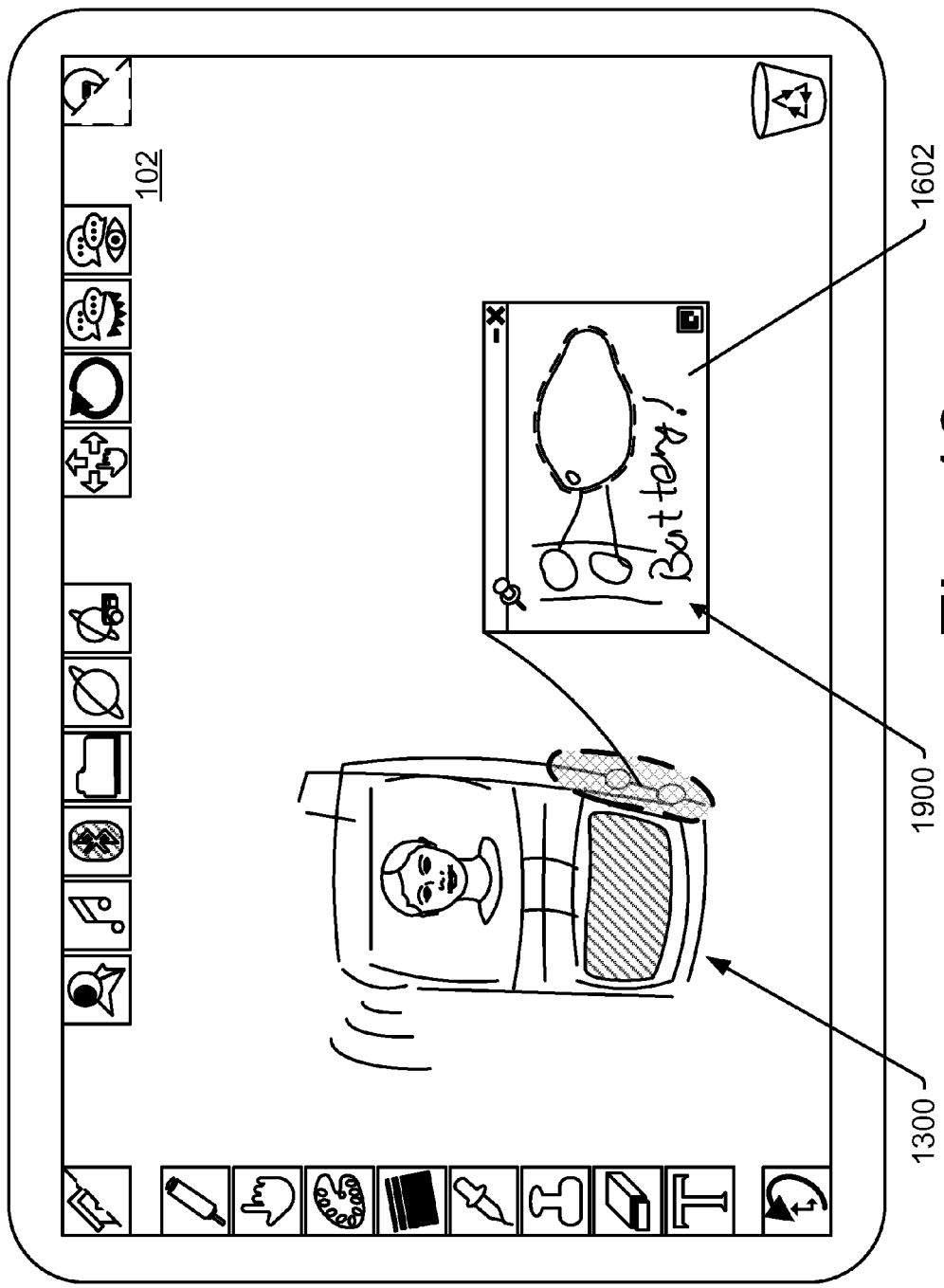
Figure 20:
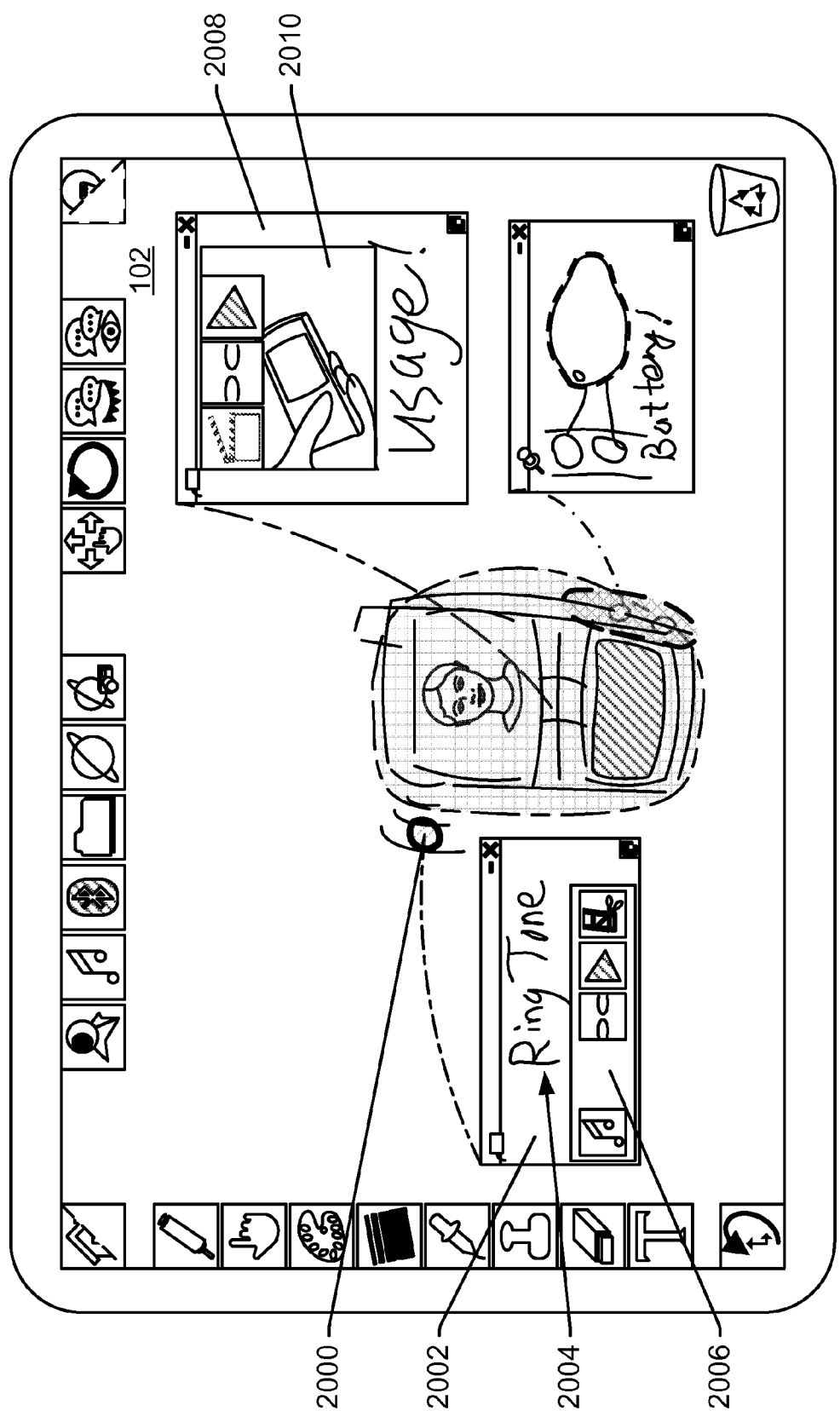

FIG. 19 shows an illustrative example of content 1900 added to the annotation canvas 1602. FIG. 20 shows illustrative examples of additional annotations. For example, annotated region 2000 may represent a point or small region that a user indicated by dwelling a finger at that region Annotated region 2000 is associated with an annotation canvas 2002. The annotation canvas 2002 shows a sketch 2004 and an audio recording 2006 associated with the annotation and associated with the annotated region 2000. Annotation canvas 2008 also shows a video 2010 associated with the annotation. These annotations may provide useful context for an audience that will view the creation at a later time.

Figure 21:
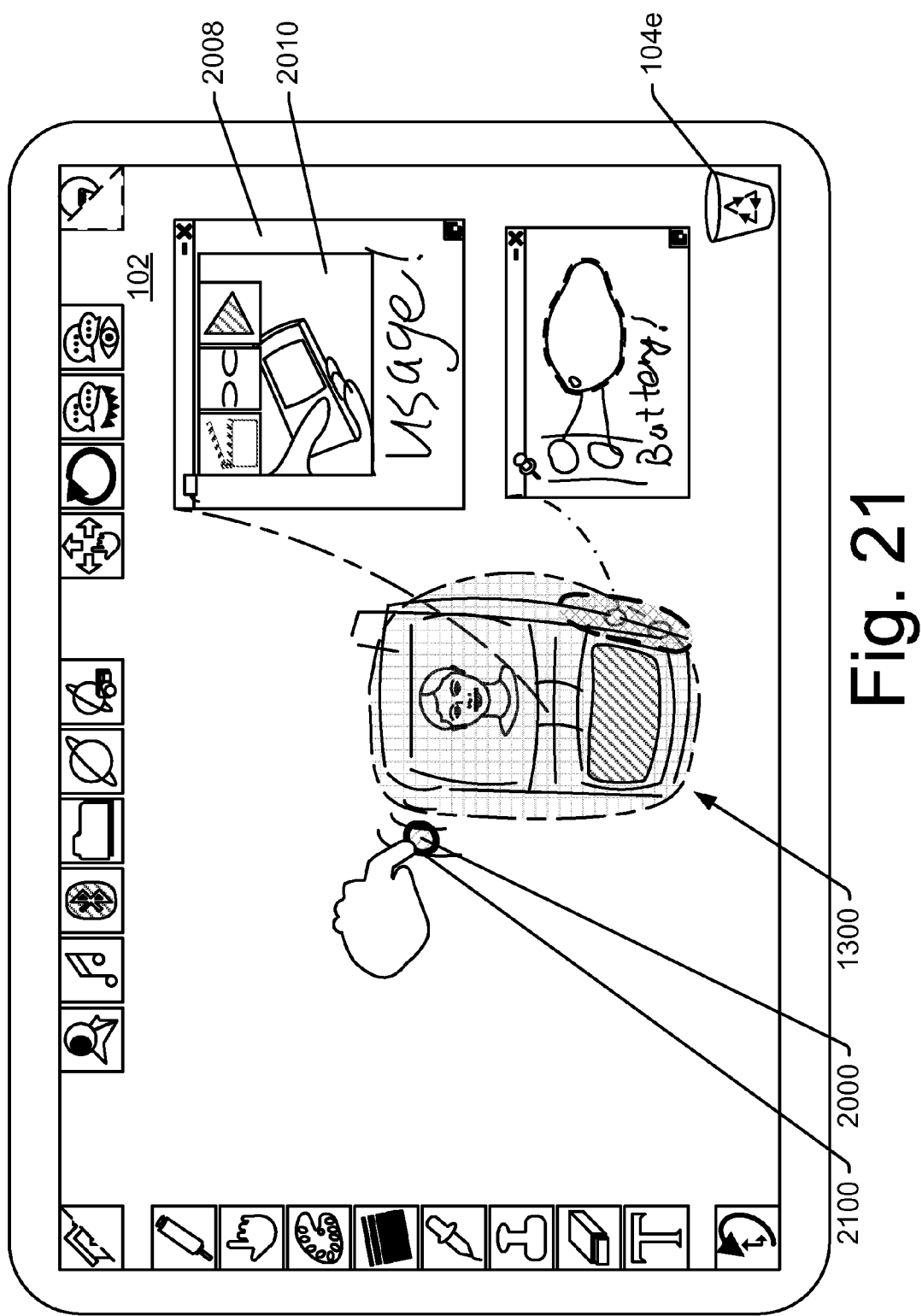

Various embodiments provide that each annotation panel may be individually hidden or shown, for example, by tapping on the corresponding annotated region indicator. For example, FIG. 21 shows that a user has tapped the indicator 2100 corresponding to the annotated region 2000 causing the annotation panel to become hidden. The indicator 2100 may remain visible in either case as an indication of an existing annotation. This may allow only showing annotations that the user is currently interested in, and may avoid visual clutter.

Figure 22:
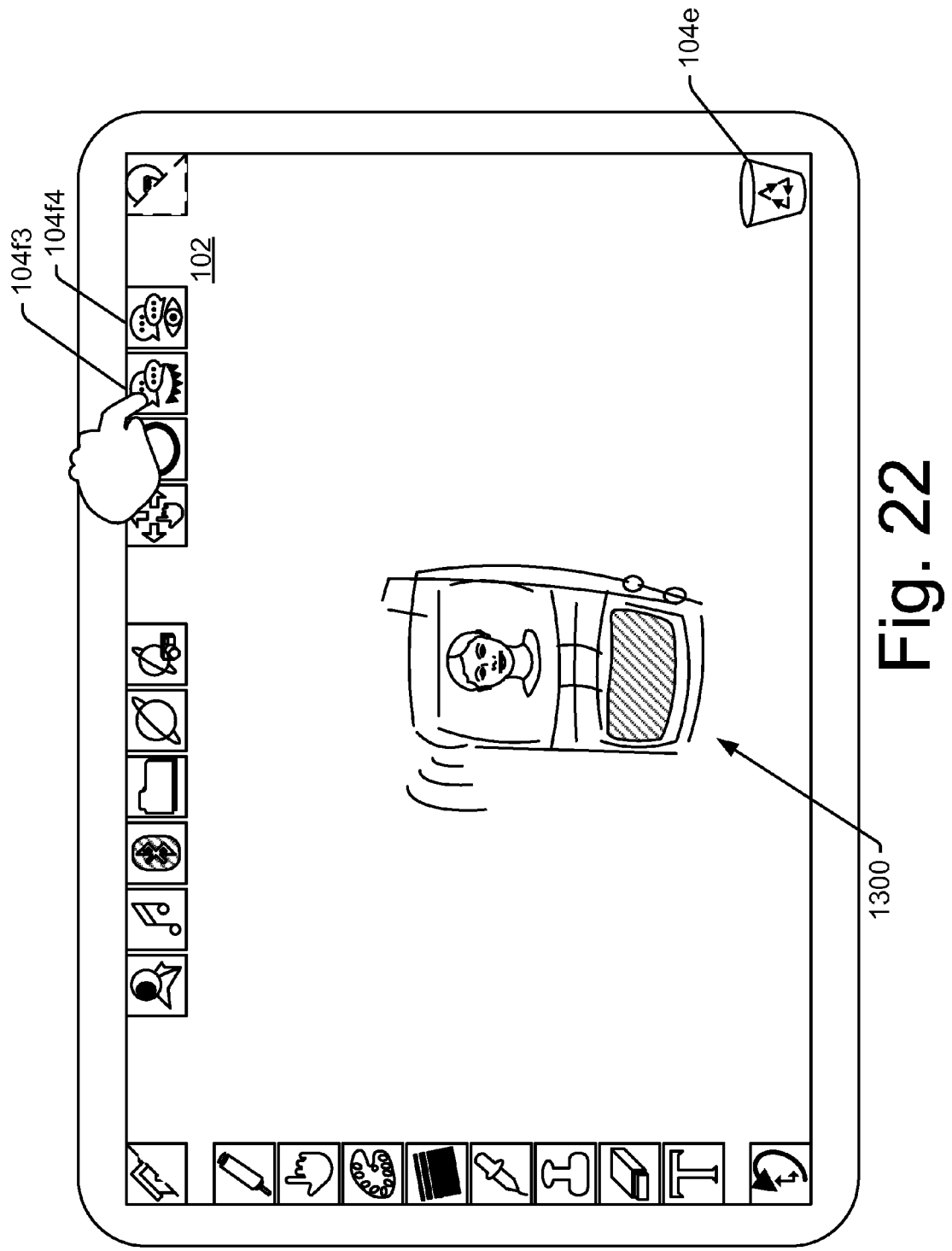

The user may also hide or show all annotations at once, so that the user may choose to see content on the canvas only or have an overview of all annotations. For example, a user may select interface button 104*f*3 to cause all of the annotation panels and annotation indicators to become hidden. FIG. 22 shows an example. A user may selected interface button 104*f*4 to cause all of the annotation panels and annotation indicators to be visible. For example, this may generate a view corresponding to the view shown in FIG. 20. A user may remove an annotation by dragging the annotation into the trashcan or recycle bin 104*e* to delete it.

The following narrative outlines an example of a user combining illustrative multimodal content on a digital canvas and in annotations to describe the user's idea. Illustrative figures are noted in relevant parentheses as non-limiting examples.

Figure 8:
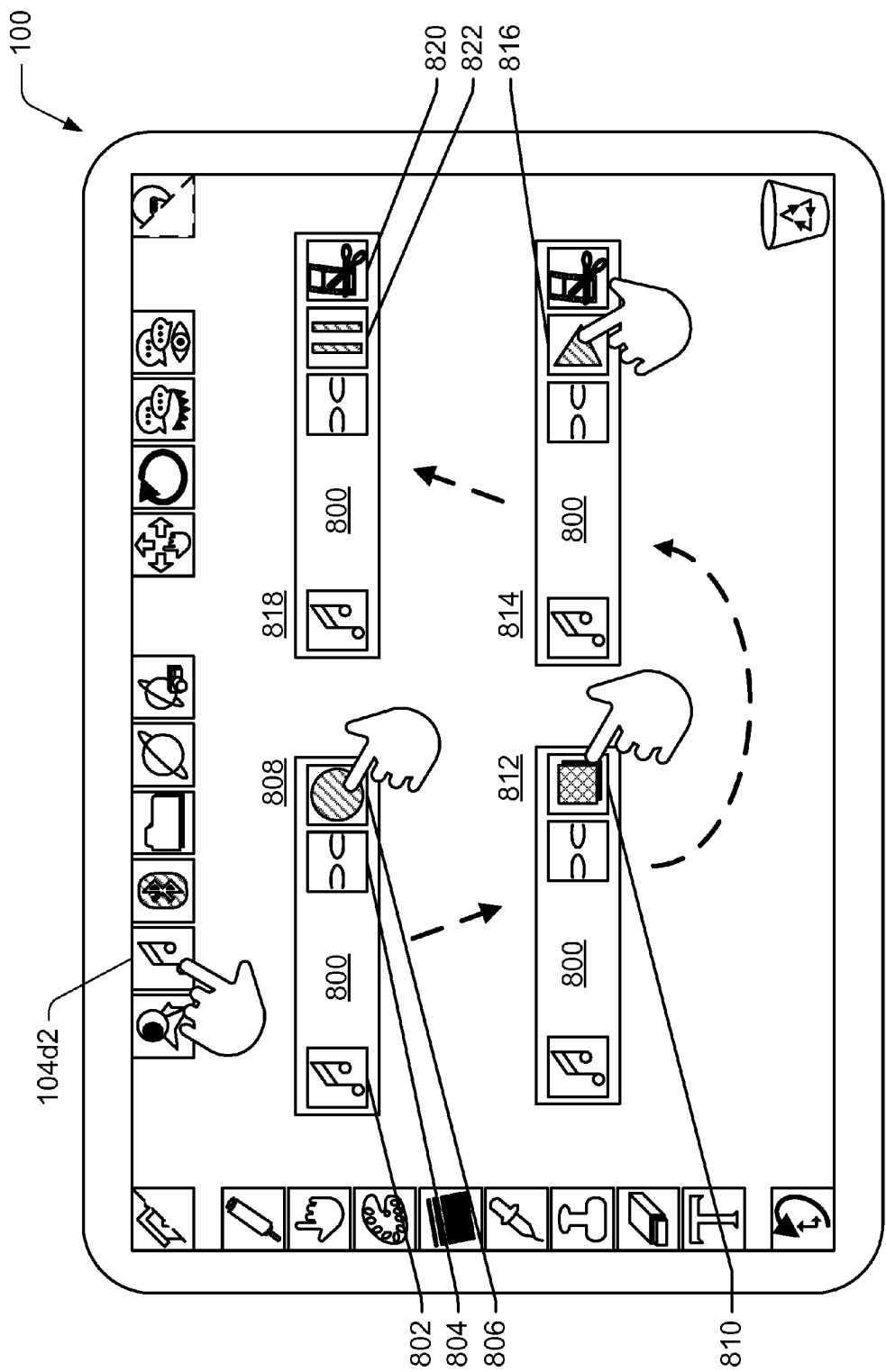
FIG. 8 is a view of an illustrative embodiment of a content capture flow.

The user wants to communicate her idea about a mobile phone design. She sketches the basic shape of the phone (FIG. 3), and captures a photo of her face (FIGS. 4-6) to be placed in the phone screen to illustrate a video call. She uses the texture sampler (FIG. 12) to select a wooden texture from her desk and paint the bottom of the phone with it to illustrate a wooden shell. Around the sound wave icon near the phone, she adds an audio annotation, recording knocks on a desk as the ringtone (FIGS. 8 and 20). She adds another annotation around the charging socket on the phone (FIGS. 14-18), this time combining sketches and a cropped photo of a mango to show the idea of charging the phone using a fruit battery (FIG. 19). Finally, she adds an annotation around the entire phone, the annotation includes a video demonstrating her hand holding a real mobile phone and using different gestures to pick up and hang up the phone, along with her verbal explanation (FIGS. 5 and 20).

Illustrative Capture of Creation Process. The progression a designer goes through in communicating an idea in a face-to-face conversation often provides the audience insight into the evolution of the idea and thought process of the designer providing additional context for the idea. Various embodiments contemplate capturing the progression of a user in creating the user's sketches and annotations.

Figure 23:
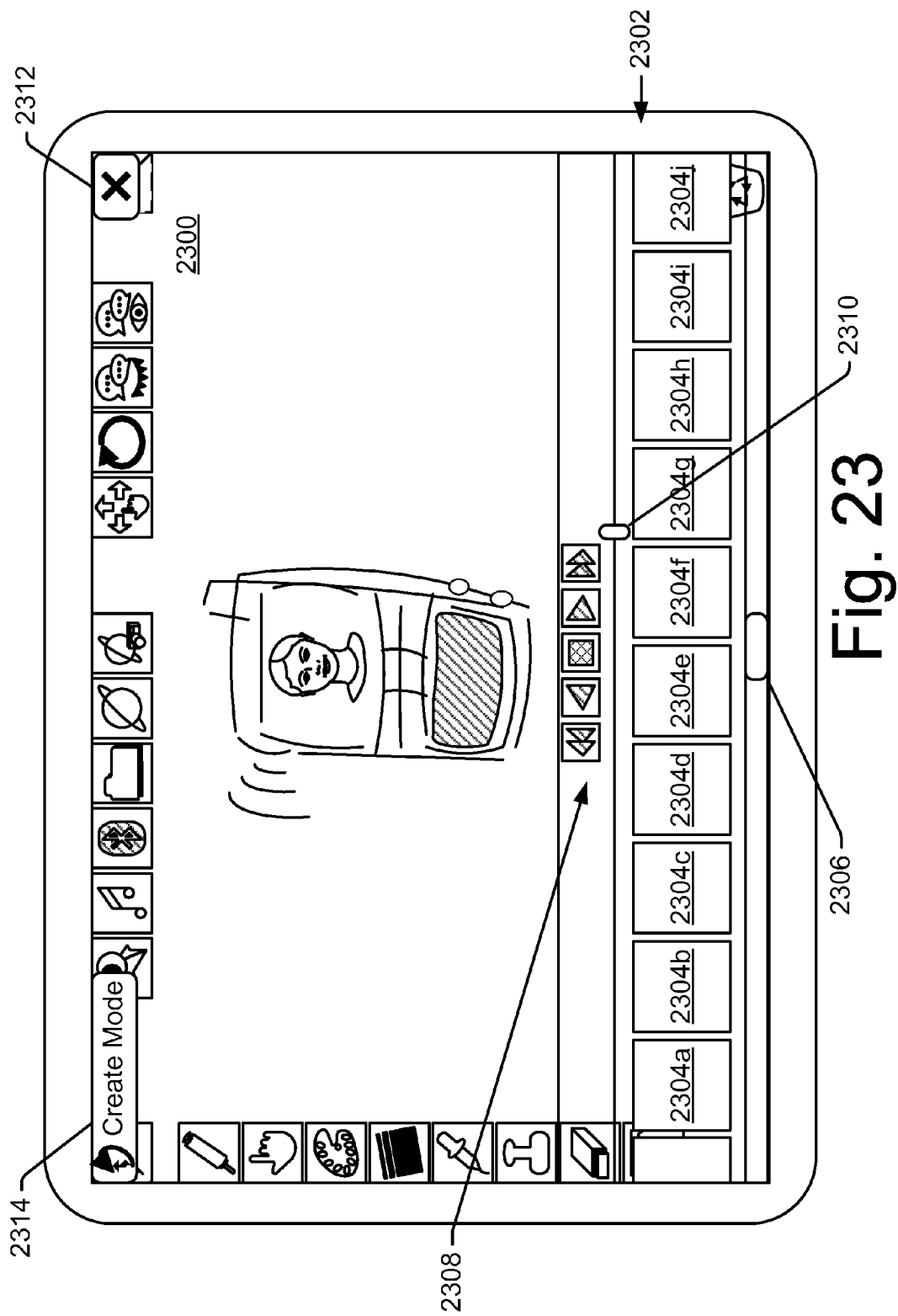
FIG. 23 is a view of an illustrative embodiment of an asynchronous communication technique through a creation process capture.

One embodiment contemplates recording a timeline of the interaction history of the user, including, but not limited to, sketching, adding annotations, capturing content, removing content, erasing sketch marks, and canvas manipulations. This may allow an audience to review the process of how the user reached the final configuration and presentation. The length of the history captured may range from the entire creation of the project, a creation session or a sub-portion thereof. The timeline may be accessed through an interface button 104*g* from the digital canvas 102 shown in FIG. 1. FIG. 23 shows an illustrative example of a digital canvas 2300 and a control interface 2302. Control interface 2302 may comprise a series of canvas thumbnails 2304*a-j*, each representing a state of the digital canvas at a corresponding time. The control interface 2302 may also comprise a slider bar 2306 that may allow a user to cycle through the displayed canvas thumbnails 2304*a-j*. This interface may allow the user to access the different time periods of the recorded interaction history. By selecting one of the canvas thumbnails 2304*a-j*, a user may cause the contents of the digital canvas 2300 to reflect the contents of a digital canvas at the corresponding time of recorded interaction history. The control interface 2302 may also comprise direction controls 2308. The direction controls 2308 may allow a user to replay the recorded interaction history at various speeds, both forwards and backwards. The control interface 2302 may also comprise a timeline marker 2310 that may indicate the position of the currently displayed state of the digital canvas 2300 with respect to the recorded interaction history. A user may select and drag the timeline marker 2310 to a desired position along its path to get to a desired point in the recorded interaction history.

Various embodiments include a user interacting with the timeline from an audience perspective as well as from the user perspective. For example, the user may start to create new material from a specific point in the timeline. One embodiment provides for the history to be overwritten from that timeline point going forward, while other embodiments provide the ability to save different timelines to allow the capture of branching of ideas. For example, a user may begin to go down one design path and change his or her mind. Additionally or alternatively, a user may want to capture alternate designs. Capture of the progression of the different design paths may provide useful contextual information for an asynchronous audience.

Illustrative Capture and Indication of Logical Order. The nature of early stage design communication may cause the communication material generated by the designer to appear less than planned and structured. This may be exacerbated when a designer is not face-to-face with the audience to facilitate the communication of a logical progression.

Figure 24:
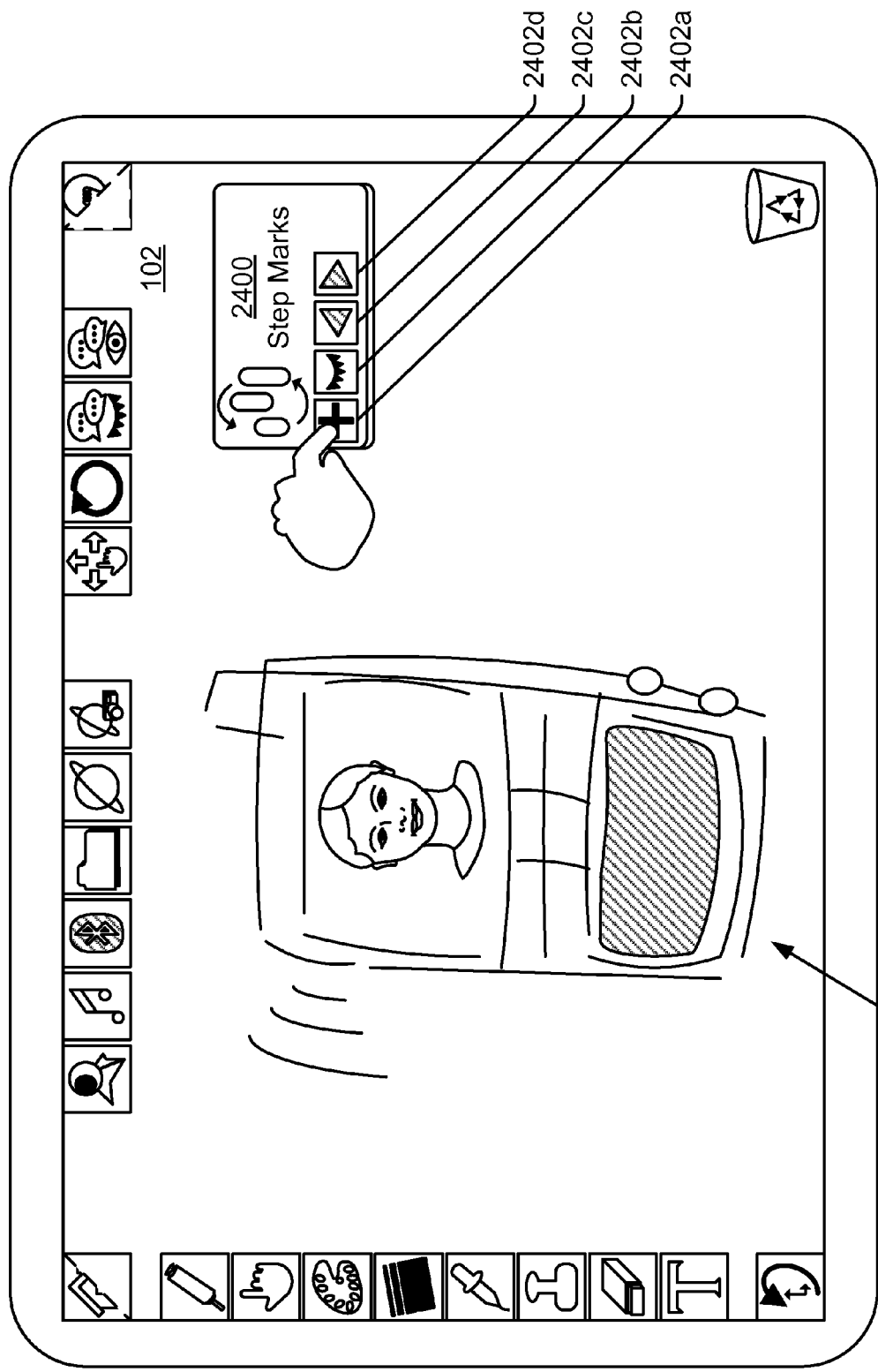
FIGS. 24-30 are views of an illustrative embodiment of an asynchronous communication technique through suggested order of indicated portions.

An embodiment provides a user the ability to indicate a logical order after the material has been created. For example, the user may create logical progression indications or "step marks" that highlight certain regions of content displayed on the digital canvas. FIGS. 24-30 show an illustrative example. FIG. 24 shows a logical progression indication menu 2400 with interface buttons 2402*a-d*. A user may select interface button 2402a to add a logical progression indicator to sketch 2404.

Figure 25:
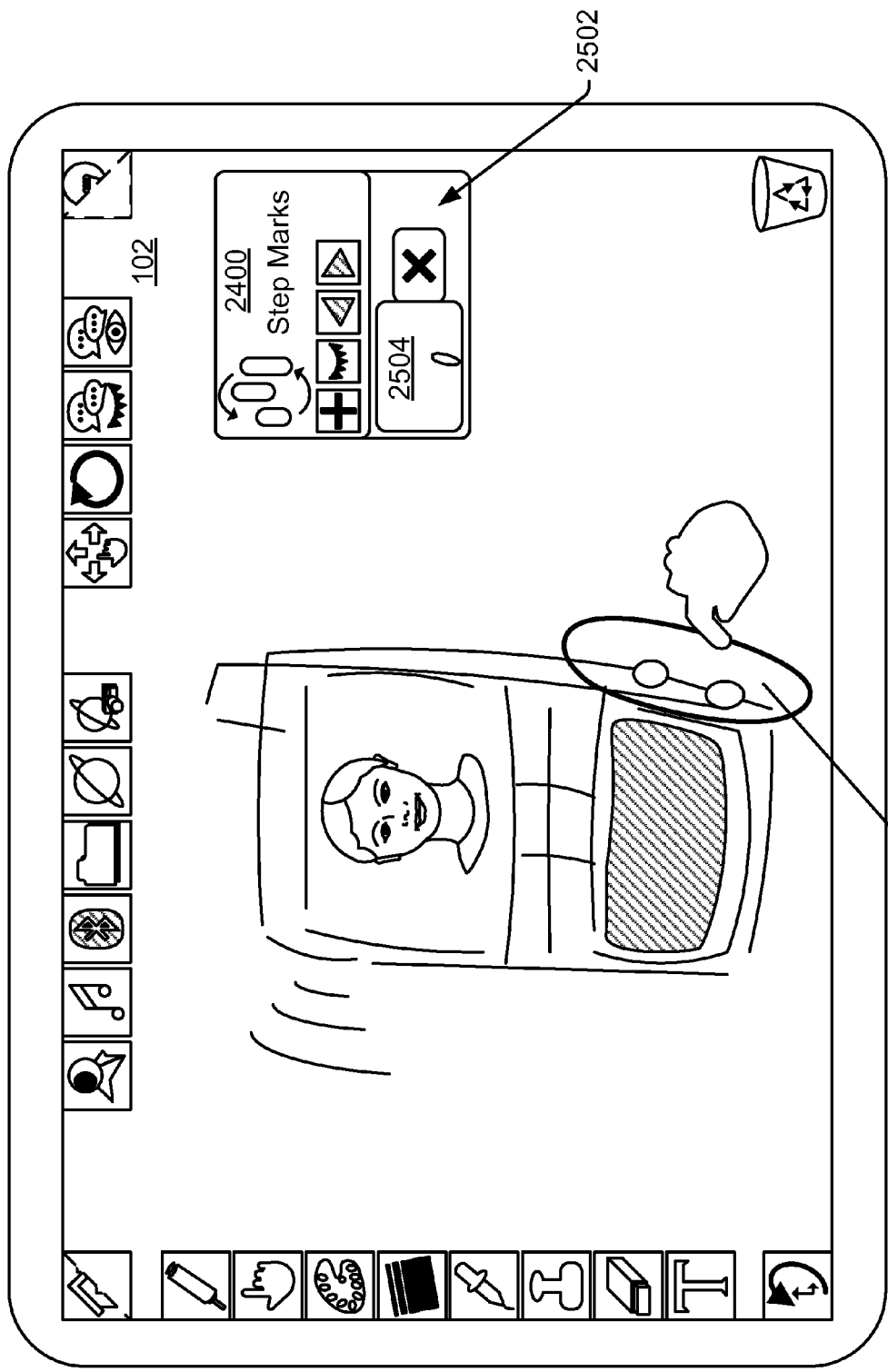
Figure 26:
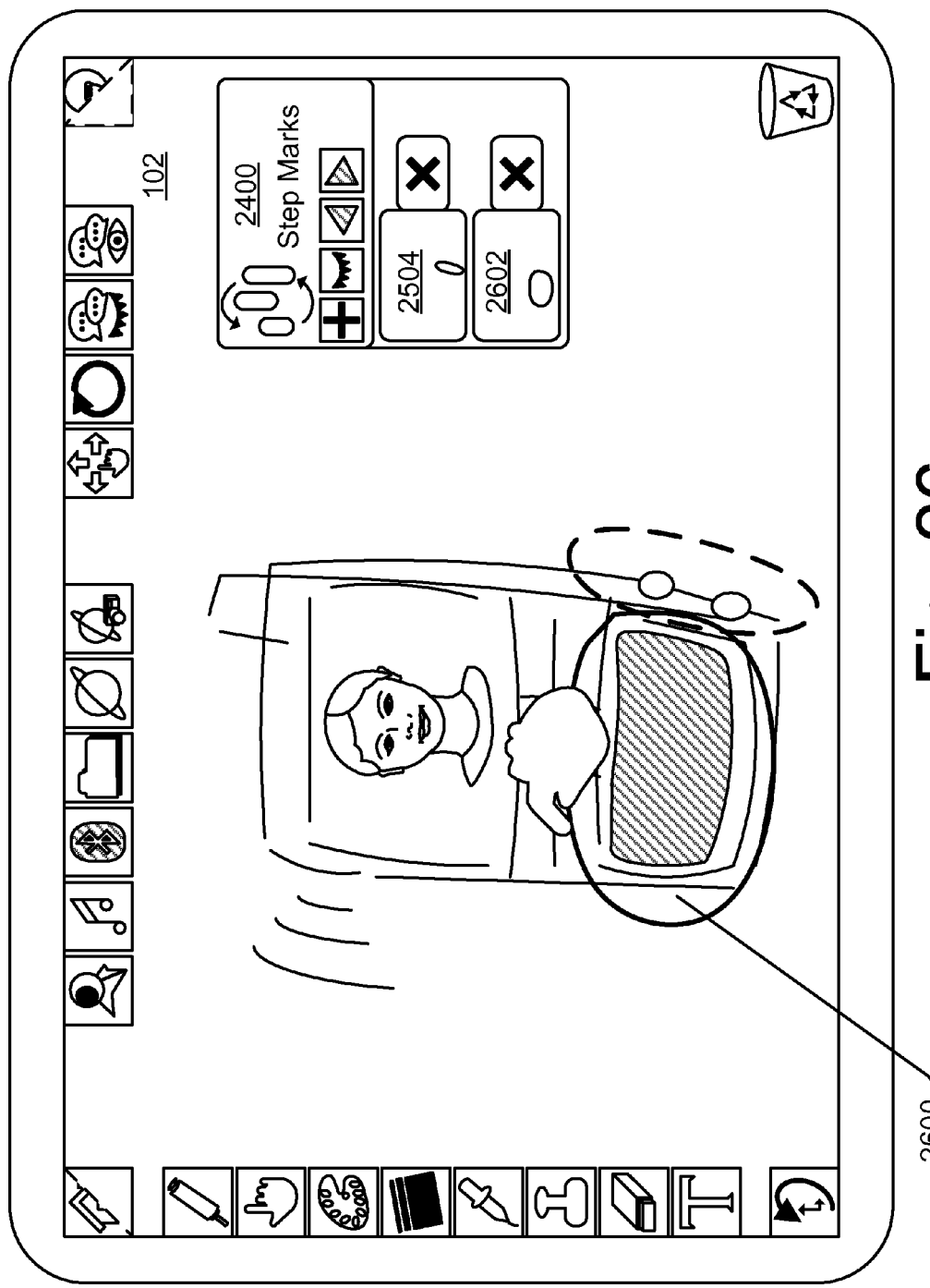
Figure 27:
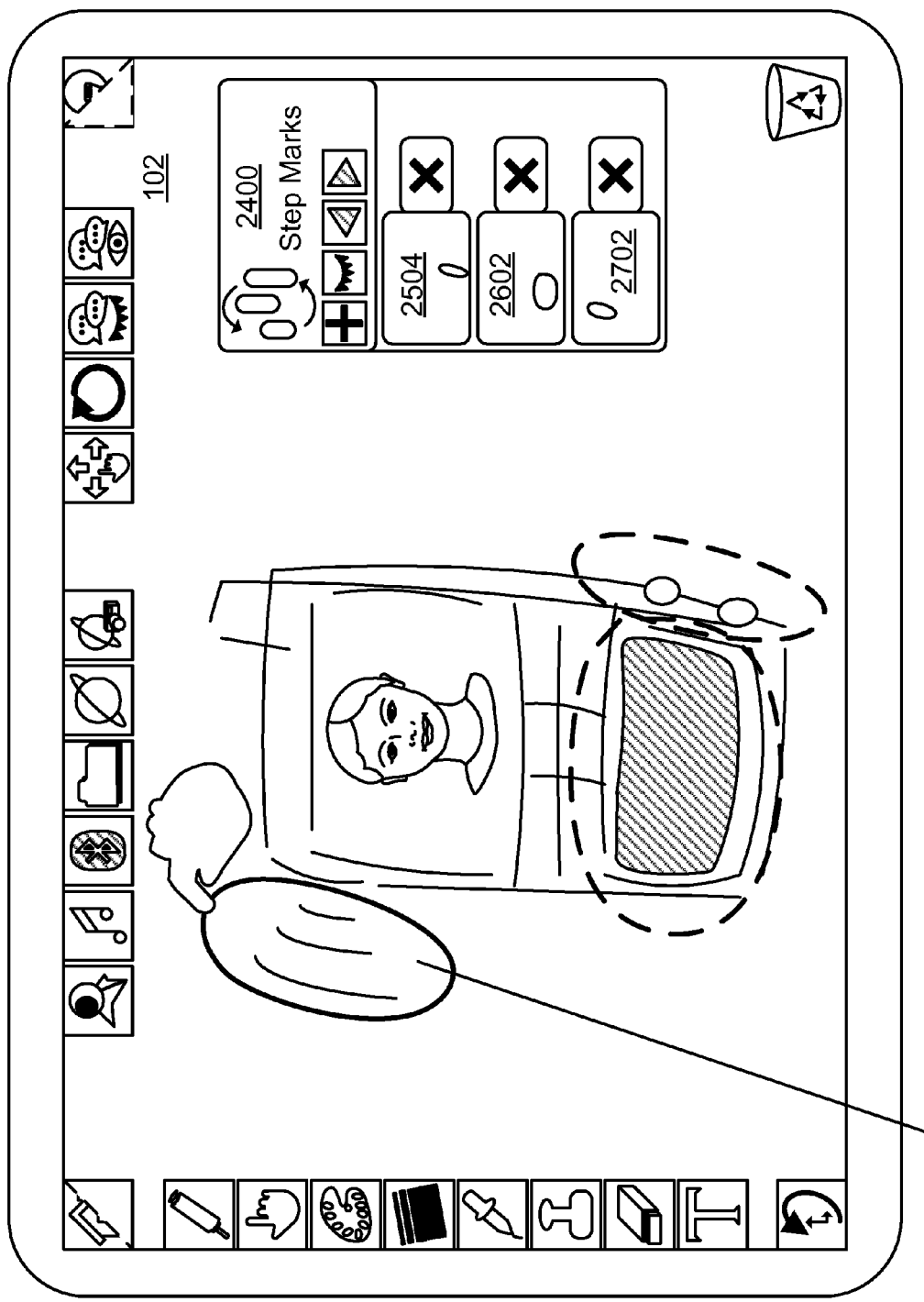
Figure 28:
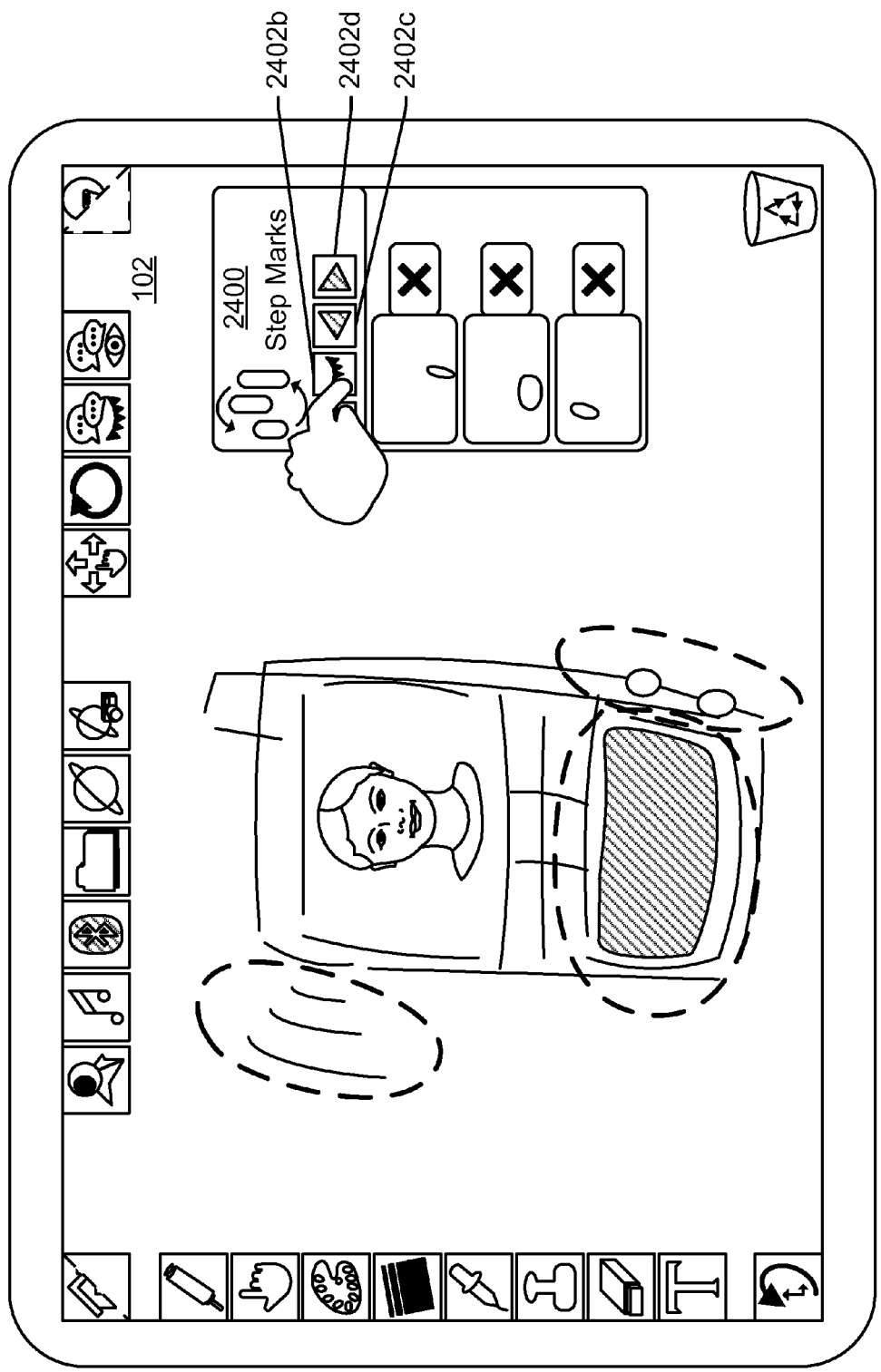

The user may then indicate the region desired. For example, the user may circle a region 2500 with a finger as seen in FIG. 25. It is understood that other forms of indication as described elsewhere are equally applicable here. Logical progression indicators may be noted in the logical progression indication menu 2400 by step marks 2502. For example, a first step 2504 may be indicated corresponding to the indicated region 2500. The step marks 2502 may comprise an area representing a digital canvas, for example, a thumbnail view, with the approximate location, shape, and relative size of the indicated region 2500 as it appears on the digital canvas 102. Additionally, or alternatively, the step marks 2502 may also comprise an area representing the digital canvas, for example, a thumbnail view, with the approximate content of the canvas, the content of the canvas associated with the indicated region 2500, or a combination thereof. FIG. 26 shows a user designating an indicated region 2600 causing a second step 2602 to appear in the logical progression indication menu 2400. FIG. 27 shows a user designating an indicated region 2700 causing a third step 2702 to appear in the logical progression indication menu 2400. Various embodiments contemplate that the steps will be listed in the order created indicating a logical order. Various embodiments contemplate allowing a user to reorder the steps after the steps are created.

Figure 29:
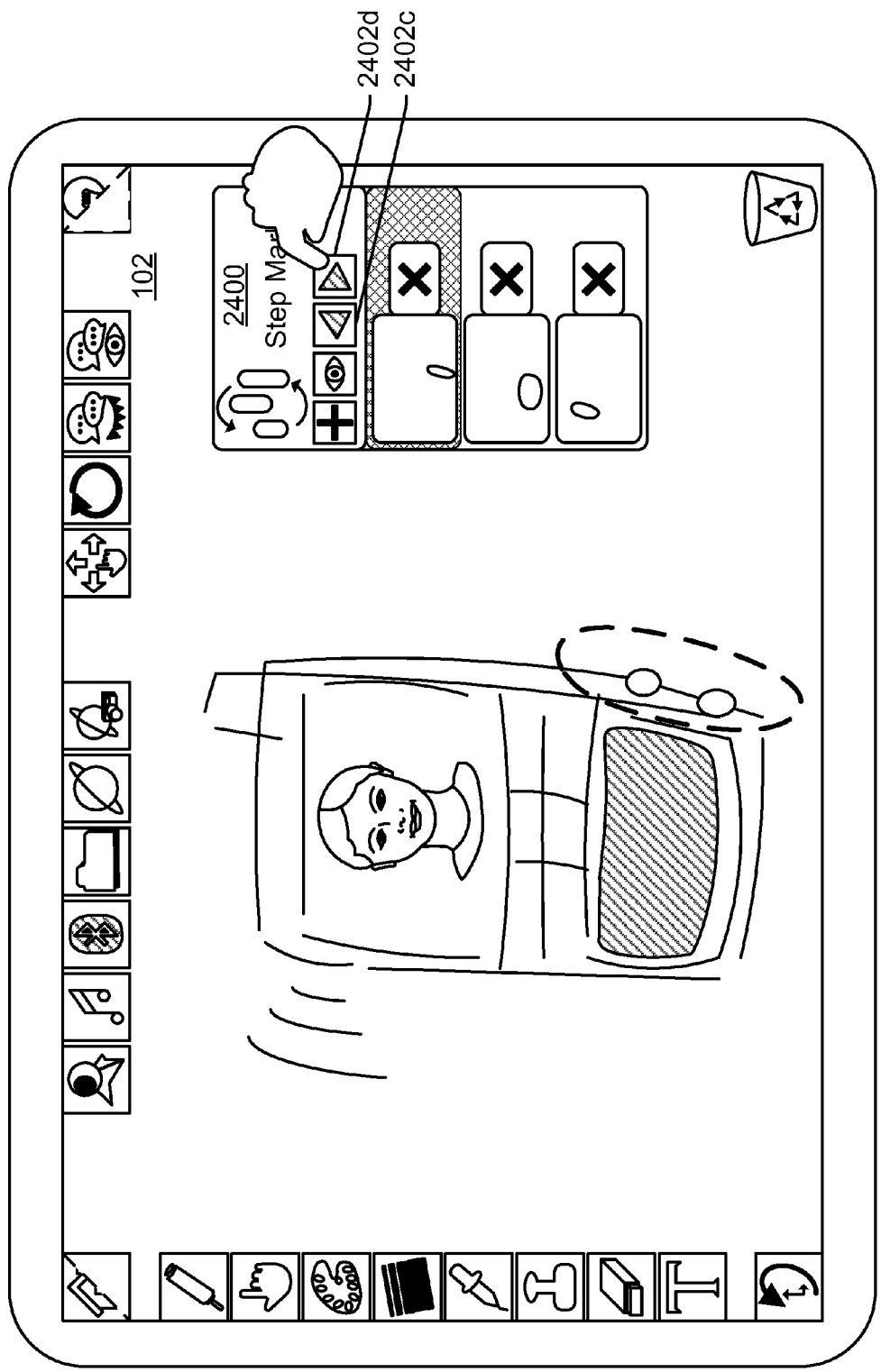
Figure 30:
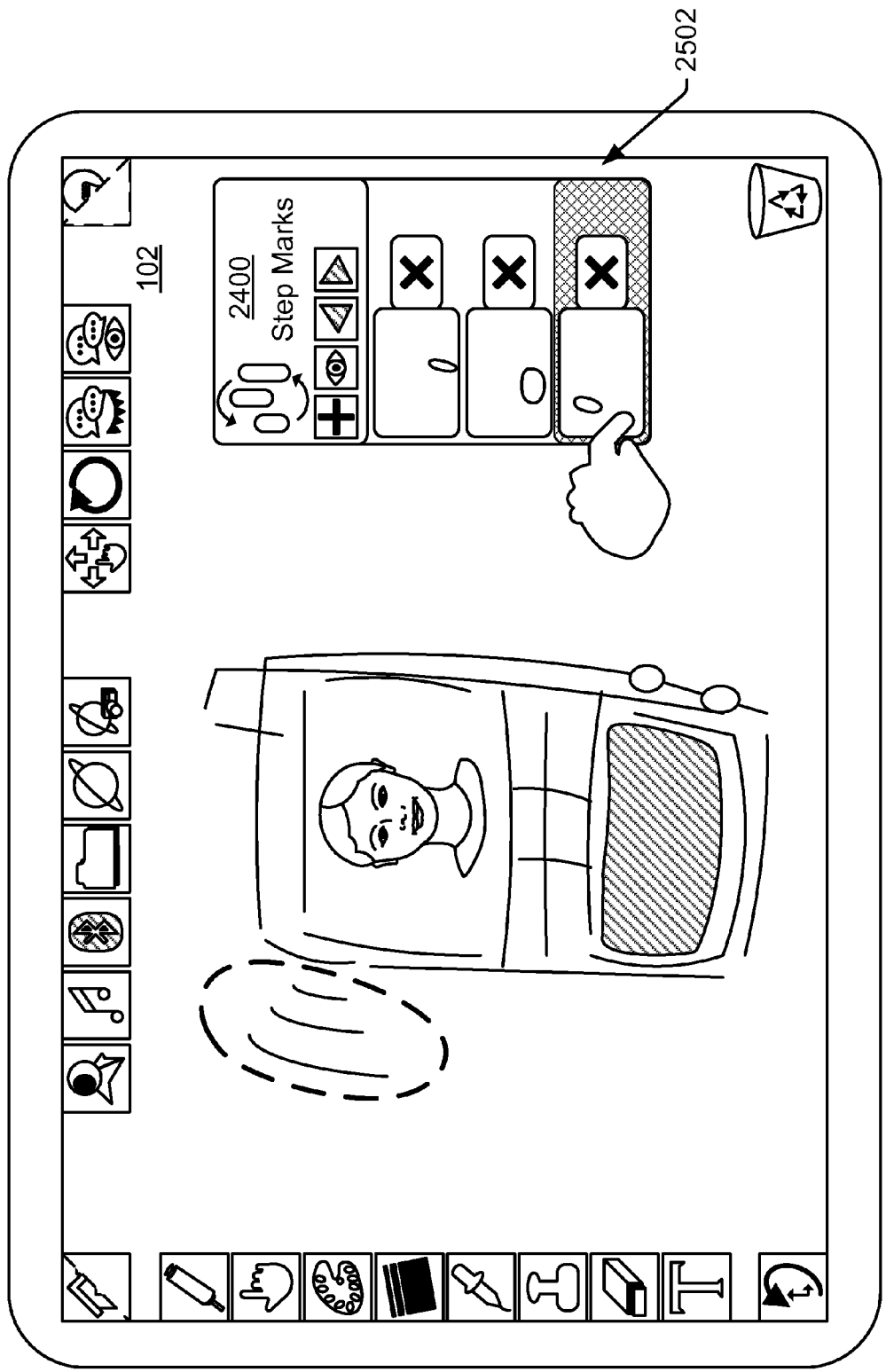

After the steps are completed, a user or audience may view each of the steps. For example, a user may select interface buttons 2402c and *d* to step and/or cycle through each step in the order listed as shown in FIG. 29. A user may view each indicated region directly by selecting the associated step mark 2502 in the logical progression indication menu 2400 as shown in FIG. 30. Accordingly, the indicated regions may be presented in the suggested logical progression. Additionally, the user may step, select, and/or cycle through or view any section, region, and/or area, in the user's own preferred progression, at random, and/or a combination of any of the three.

The step marks may provide a lightweight suggestive viewing path for the audience to guide and enhance understanding, while not binding the audience to a limited course of interaction.

The following narrative outlines an example of a user leveraging the logical progression indication to illustrate the user's idea. Illustrative figures are noted in relevant parentheses as non-limiting examples.

The user wants to communicate his idea about a mobile phone design. He sketches the basic shape of the phone (FIG. 3). Around the power input region, he indicates that the phone should be plugged in to a power source (FIG. 25). He indicates around the keyboard that the software program may be activated by a combination of key strokes (FIG. 26). Around the sound wave icon near the phone, he indicates that the phone's ring may correspond to the type of power source (FIG. 27). For example, a fruit battery may cause a different ring from a lithium ion battery alerting the phone's user how long they may talk on the phone.

Figure 31:
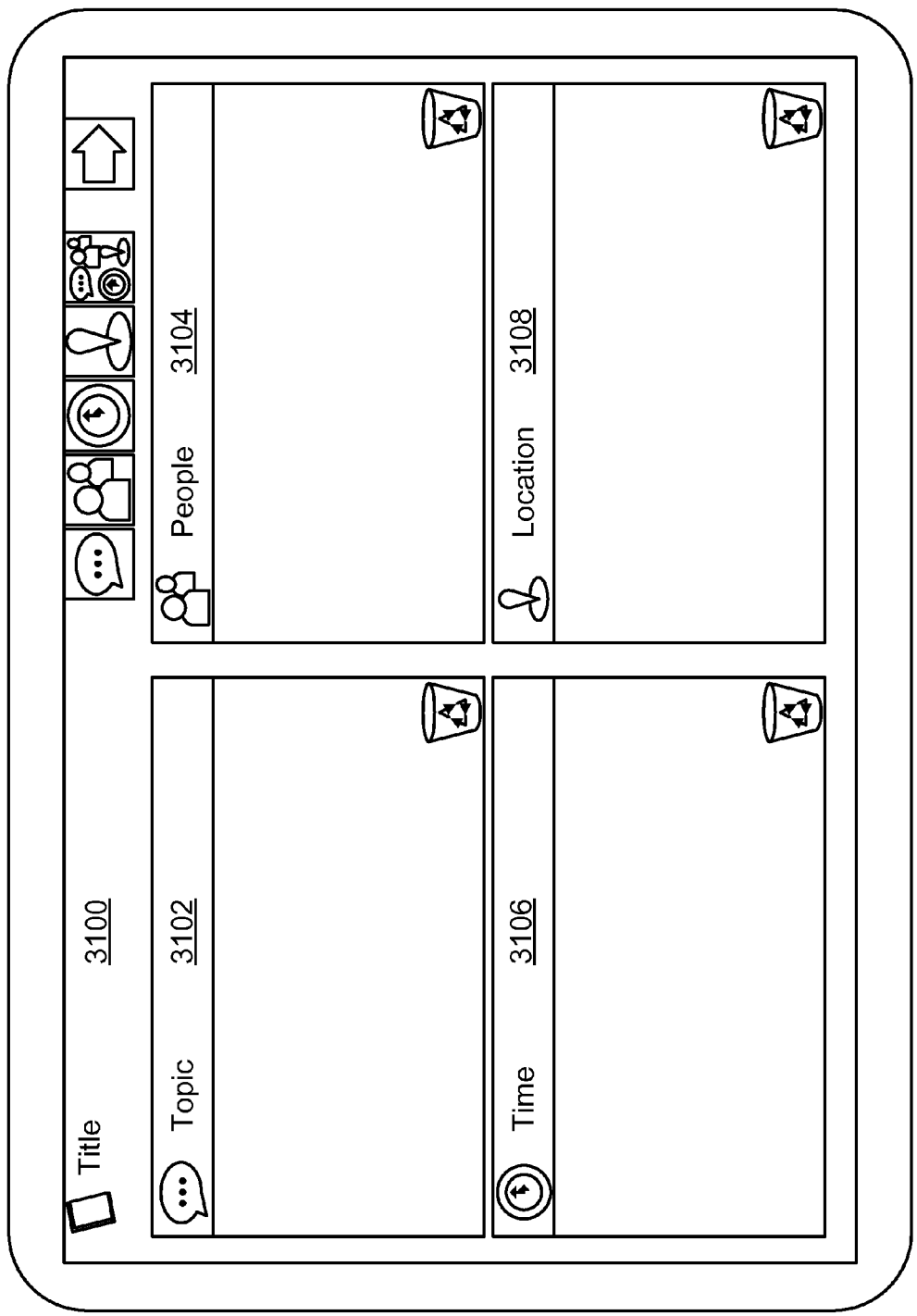
FIGS. 31 and 32 are views of an illustrative embodiment of an asynchronous communication technique through communication context.
Figure 32:
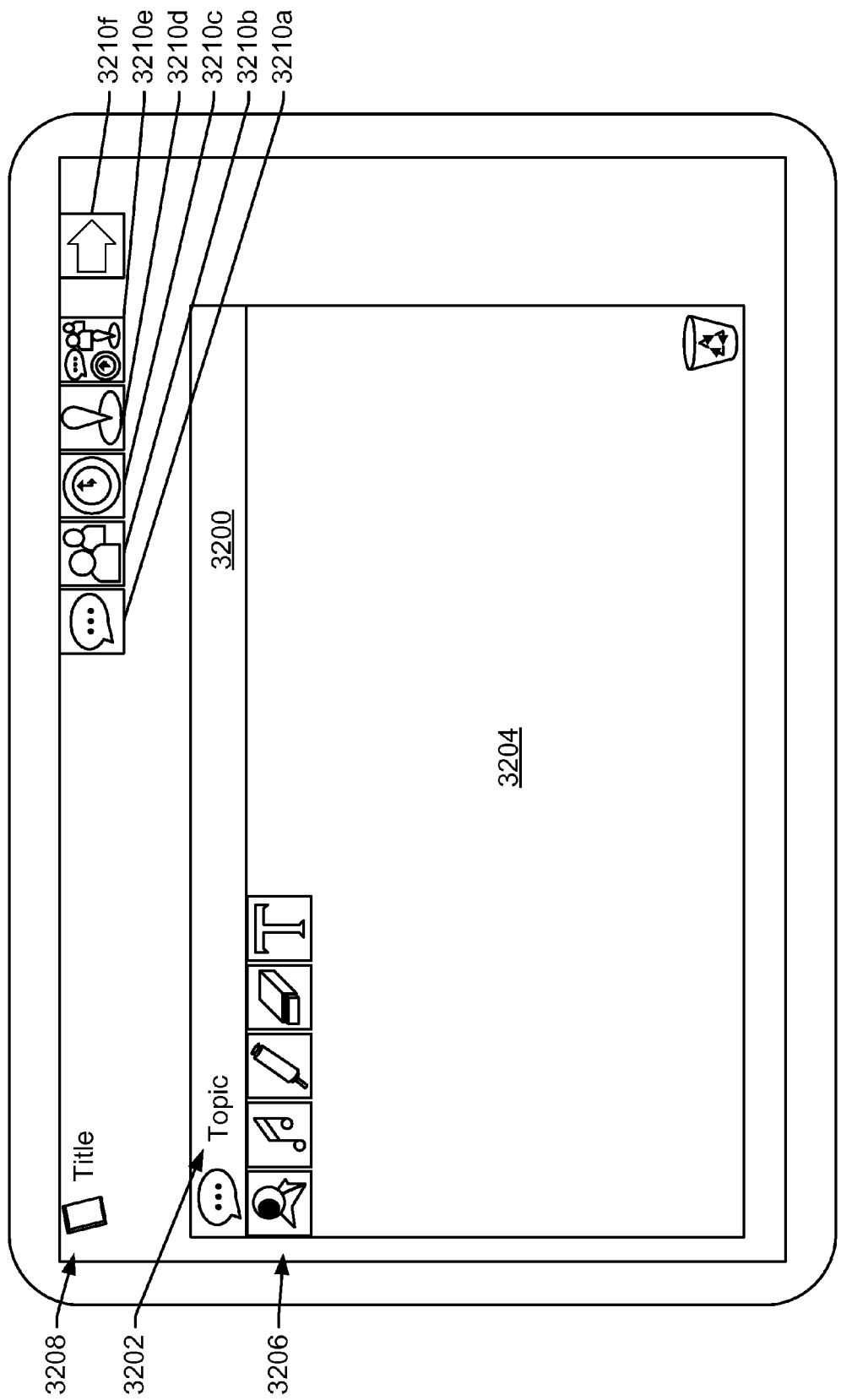

Capturing Communication Context. An embodiment contemplates a suggestive feature to assist a user in capturing and conveying the overall context of the communication session. For example, the user may open a communication context screen, which may include various suggested fields to include. For example, four fields may be suggested: Topic, People, Time, and Location. Each field may comprise a blank canvas in itself, and the user may fill it with a combination of sketch and captured content to convey the associated communication context in a flexible and vivid way. FIG. 31 shows an example of a communication context screen 3100 comprising four suggested information panels 3102-3108. Selection of an information panel may cause the information panel to enlarge and provide a digital canvas on which a user may add content. For example, an information panel 3200 may have a label 3202, for example "Topic," as shown in FIG. 32. The information panel 3200 may provide a canvas 3204 where a user may add content. The content available to be added may be the same, similar, or a subset of all of the content available to be added to other canvases as discussed. For example, FIG. 32 shows a canvas 3204 with interaction buttons 3206. It may be beneficial to present a subset of the capture tools to help focus a user on capturing the content in an efficient manner. Additionally, a title or filename may be displayed. For example, FIG. 32 shows title 3208.

The communication context screen 3100, as shown in FIG. 31, and the individual topic screens, as seen in FIG. 32 for example, may also include interface buttons 3210a-f to allow a user to navigate between the different screens. For example, a user may jump to the "Topic" screen by selecting interface button 3210a, the "People" screen by selecting interface button 3210b, the "Time" screen by selecting interface button 3210c, the "Location" screen by selecting interface button 3210d, the communication context screen by selecting interface button 3210e, or returning to the previous screen by selecting interface button 3210f.

Review Mode. Various embodiments contemplate allowing for an audience to review the created material. In an embodiment, the audience is limited to viewing and exploring the created material without the ability to add material.

For example, the Review mode may be a read only mode of the application. It may include all viewing, navigating, and replaying functions as in the Creation mode, but may not allow the addition or modification of content. This may allow the audience to review the communication material created by the user to understand the idea being expressed.

An embodiment contemplates allowing an audience to add a limited amount of material. For example, an audience may be allowed to offer feedback by adding content. The allowed content may be the same type or a reduced subset of the content available to be added in the creation as discussed. An embodiment contemplates allowing an audience full capabilities of creating and removal of content. This embodiment may allow an audience member to build upon the creation as communicated by the user.

Some or all of the material created by the user may be stored in a single integrated file, project folder, or a combination of the two, which may be then transferred to an audience through a network including by file sharing, email, instant messaging, or other channels. The audience may then open the project to view, for example, in a Review mode.

Illustrative Processes

For ease of understanding, the processes discussed in this disclosure are delineated as separate operations represented as independent blocks. However, these separately delineated operations should not be construed as necessarily order dependent in their performance. The order in which the processes are described is not intended to be construed as a limitation, and any number of the described process blocks may be combined in any order to implement the process, or an alternate process. Moreover, it is also possible that one or more of the provided operations may be modified or omitted.

The processes are illustrated as a collection of blocks in logical flowcharts, which represent a sequence of operations that can be implemented in hardware, software, or a combination of hardware and software. For discussion purposes, the processes are described with reference to the system shown in FIGS. 1-32 and 37. However, the processes may be performed using different architectures and devices.

Figure 33:
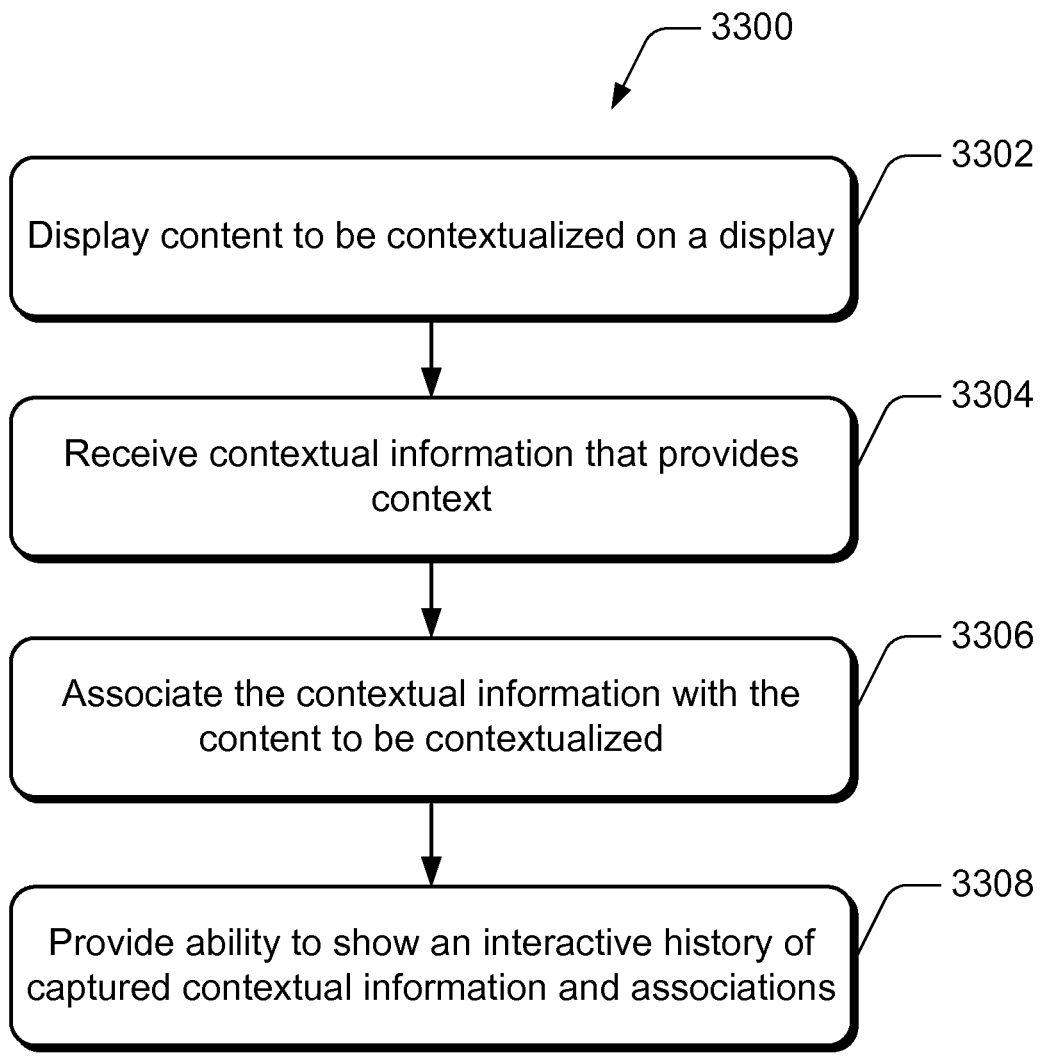
FIG. 33 is a flowchart showing an illustrative method of communicating asynchronously with contextual content.

FIG. 33 illustrates a flowchart of a process 3300 of communicating asynchronously through the use of contextual information. At 3302, content to be contextualized is displayed on a digital canvas. The content to be contextualized may be a digital sketch created by the user. The sketch may be created by the user in the same session in which contextual information is captured. The sketch may be created by the user or someone else at a different time or location. The sketch may be drawn on paper and scanned in. The content to be contextualized may comprise a compilation of shapes, images, or other content to which the user seeks to add context.

At 3304, contextual information is captured to provide context to the content to be contextualized. The contextual information may illustrate or communicate time, place, environment, participating people, goal, topic, an example, or an example of a similar idea among other categories of information that may be useful to communicate. The contextual information may comprise an image, a video, a sound recording, text, animation, color, texture, shape, or a sketch. Various elements may be combined to cause the contextual information to comprise multimodal annotations. For example, a multimodal annotation may include an audio and a visual element.

The capture of the contextual information may comprise capture of contextual information from a surrounding environment of the user or an environment distant from the user. In either case, the contextual information may be provided to the user through a wired or wireless connection. The capture may be through a cellular phone, digital camera, a microphone, a mouse, a touch pad, a digital pen, a digital scanner, a touch screen, or other suitable approach.

The contextual information may comprise a color, texture, or shape captured from the real world. The capture may include sampling a real-time video feed for a color or texture, or allowing a user to trace over the real-time video feed. Static images or other sources may also be sampled or traced to capture the desired features.

The contextual information may comprise a recording of the user verbally describing context of a sketch. This may be coupled with an ability to later present, possibly to an audience, a representation of a sketch drawn by the user and displayed over a period of time in steps. Here, the steps correspond to the chronological order in which the sketch was created, and the time corresponding to the length of the recording. For example, a user may sketch a stick person and describe each sub-stick of the stick person as the user draws. The user, or audience, may then play back the recording of the user describing each stick while a display shows each sub-stick, or portion thereof, being drawn, or appearing, in synchronization with the recording.

At 3306, the contextual information is associated with the content to be contextualized. The association may be in the form of an annotation. The annotation may comprise a sketch, a video, an image, and/or a sound recording. The annotation may be multimodal by engaging more than one type, style, or form of contextual information.

The contextual information may also be associated to the content to be contextualized by contemporaneously generating the content to be contextualized along with the contextual information. For example, the contextual information may comprise an audio, a video, or an audio-video recording. The contextual information may be captured at the same time that at least a portion of the content to be contextualized is generated by a user. For example, a user may draw a sketch and record his or her in a video providing context for the sketch by describing the sketch, the overall setting of the sketch, among other things. Various embodiments contemplate the ability to later present the generated content to be contextualized in a number of creation steps synchronized with a presentation of the contemporaneously captured contextual information. For example, the captured video of a user providing context for the sketch may be replayed while a representation of the sketch is drawn as the video plays.

At 3308, the history of the captured contextual information and the associations made to the content to be contextualized is presented in an interactive format. An embodiment contemplates displaying the content to be contextualized and captured and associated contextual information in a timeline configuration where the user may cycle through at least the steps of display, capture, and association in a chronological and a reverse-chronological order according to an order in which the steps were performed.

Figure 34:
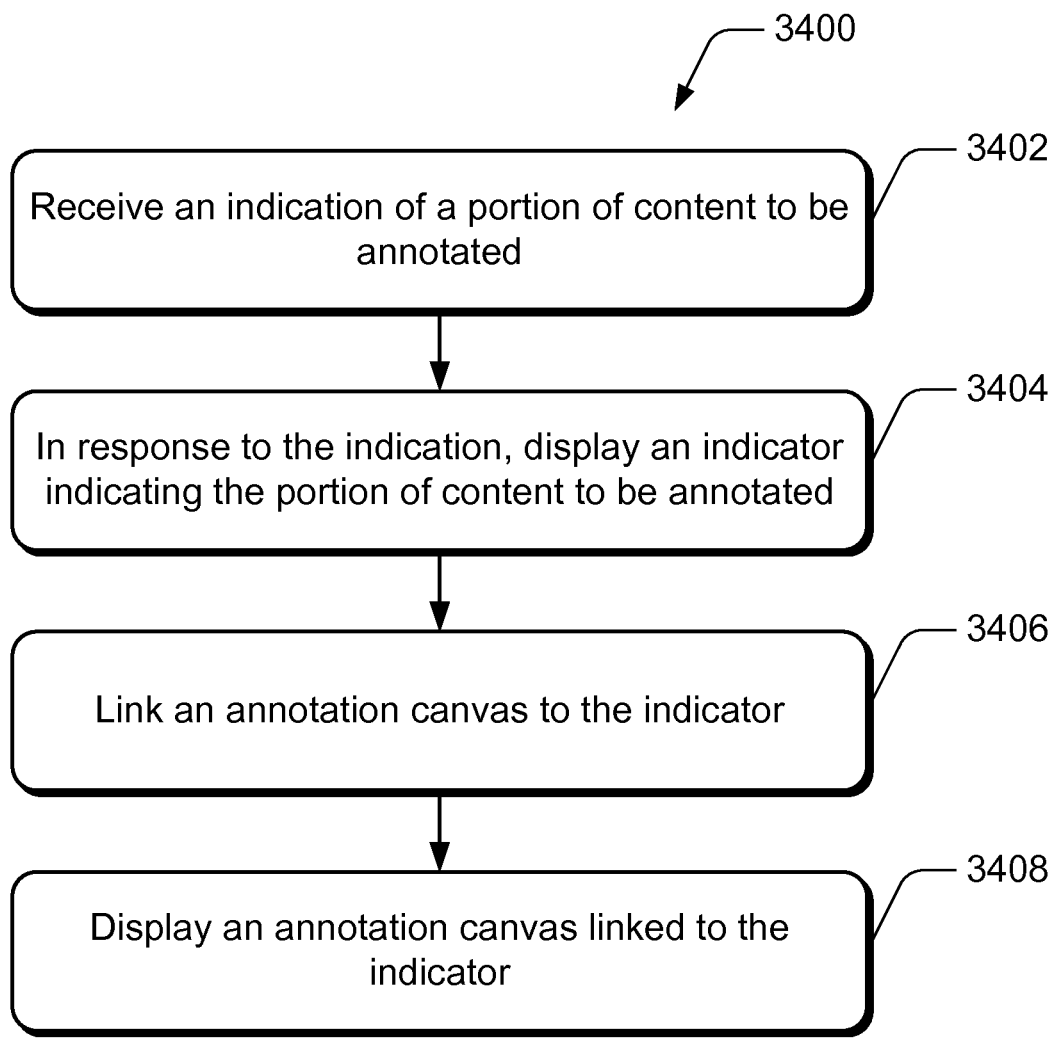
FIG. 34 is a flowchart showing an illustrative method of communicating asynchronously with annotations.

FIG. 34 illustrates a flowchart of a process 3400 of communicating asynchronously through the use of annotation. At 3402, an indication is received. The indication indicates a portion of content to be annotated on a digital canvas. The indication received may come through a user touching a touch screen with his or her finger, a stylus, a pen, a mouse, or other suitable input sources as noted throughout. In an embodiment, the indication may be limited to certain input devices. For example, an input may be distinguished between a finger and a pen or other device, such if a finger's touch is sensed, then an indication is received, whereas, if a pen's touch is sensed, then an indication for these purposes is not received. However, the pen may still be used to trigger a different function.

The indication may comprise a user dwelling on a certain portion of content. This may cause an indication to be associated with a point or a small area of content. The indication may comprise a user tracing a user defined border around the portion of content to be annotated to indicate the portion of content to be annotated. This indication may be of various shapes as sizes.

At 3404, an indicator is displayed on the digital canvas indicating the portion of content to be annotated. This display may be in response to the indication at 3402. The indicator may comprise a border defining or indicating the annotated area. The border may have a first opacity while the annotated area has a second opacity. In various embodiments, the first opacity and the second opacity are inversely proportional to the size of the annotated area. Additionally, the first opacity and the second opacity may be inversely proportional to the length of the border. Further, the first opacity may be greater than the second opacity. This may cause the indicator to appear as a halo.

At 3406, an annotation canvas is linked to the indicator. The linking may be by reference or other association.

At 3408, the annotation canvas is displayed as linked to the indicator. The annotation canvas may initially be displayed as not overlapping or covering the indicated portion of content to be annotated. The annotation canvas may be configured to be moveable or fixed in relationship to the indicator. The annotation canvas may comprise multimodal information. The types of multimodal information and the avenues of adding multimodal information discussed throughout this disclosure are available to add content to the annotation canvas.

Figure 35:
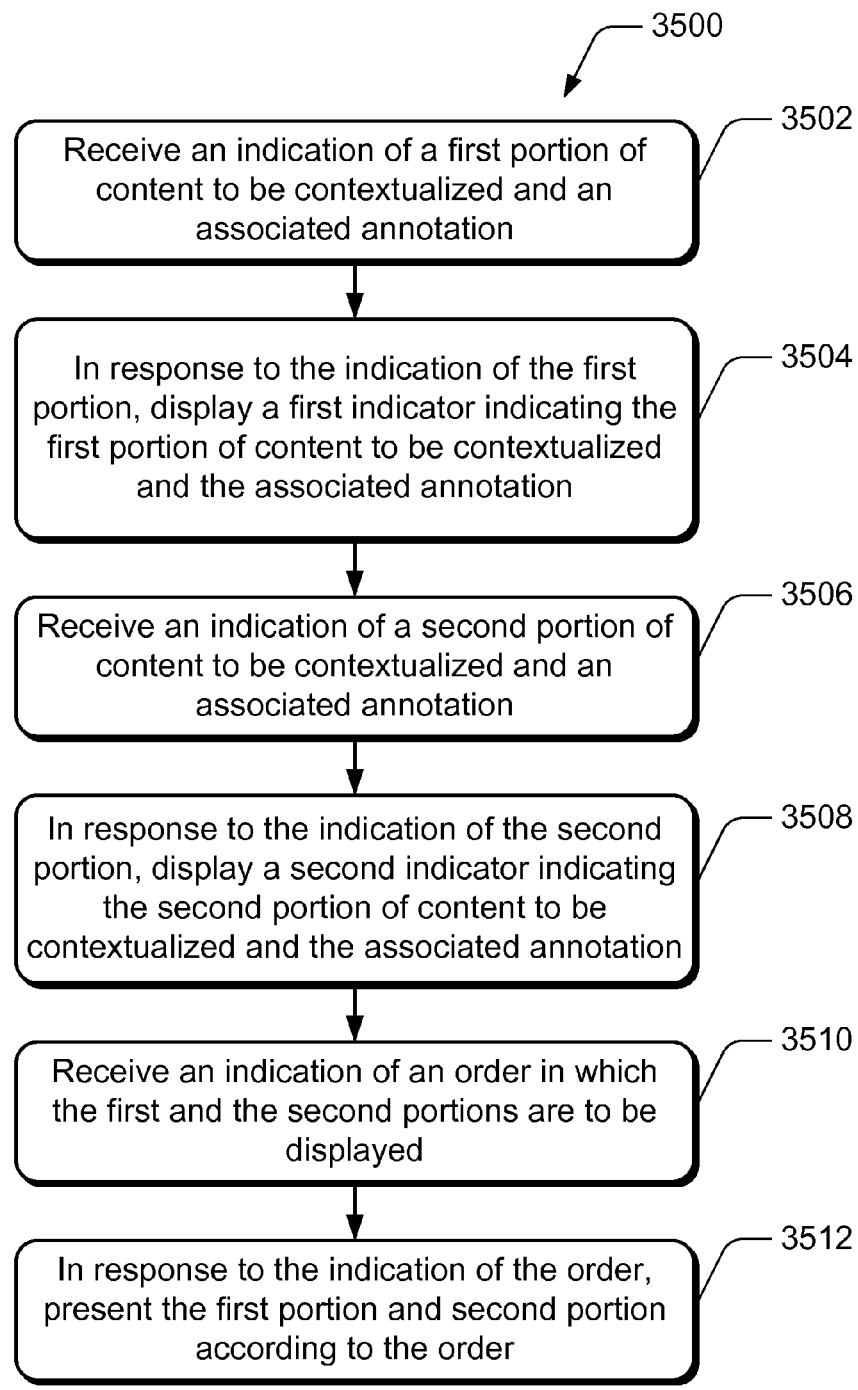
FIG. 35 is a flowchart showing an illustrative method of communicating asynchronously with ordered indications.

FIG. 35 illustrates a flowchart of a process 3500 of communicating asynchronously through the use of suggested order indications. At 3502, an indication is received. The indication indicates a first portion of content to be contextualized and any associated annotations.

At 3504, a first indicator is displayed indicating the portion of content to be contextualized and any associated annotation. This display may be in response to the indication received at 3502.

At 3506, an indication is received. The indication indicates a second portion of content to be contextualized and any associated annotations.

At 3508, a second indicator is displayed indicating the portion of content to be contextualized and any associated annotation. This display may be in response to the indication received at 3506.

At 3510, an indication of an order is received. The indication comprises an order in which the first portion and second portion should be displayed. The order may be a suggestion of a logical order in which to view or examine the indicated content.

At 3512, the first and second indicators are presented according to the order indicated at 3510. The display may be in response to the indicated order. For example, the first indicator will be displayed and then the second indicator will be displayed. The first indicator or second indicator may also be hidden in response to the indicated order. Both the indicators may be shown or hidden at the same time. The number of indicators may be greater than or fewer than two.

Figure 36:
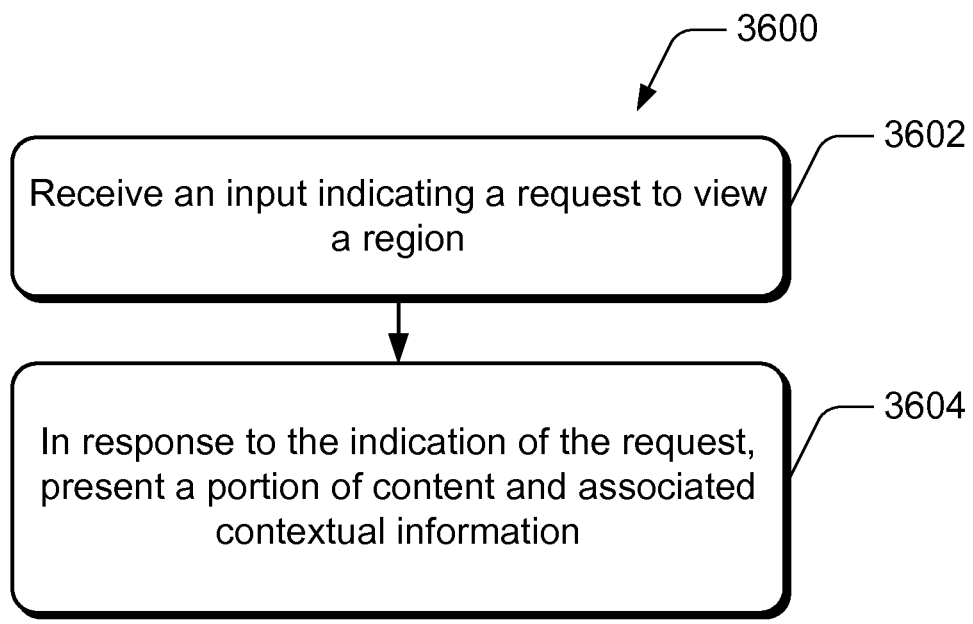
FIG. 36 is a flowchart showing an illustrative method of communicating asynchronously with a request to view.

FIG. 36 illustrates a flowchart of a process 3600 of communicating asynchronously through the use of a request to view. At 3602, an input is received. The input indicates a request to view a region. The region may comprise a portion of content and associated contextual information. For example, the content may comprise a digital sketch. The contextual information may comprise multimodal information. The multimodal information may comprise two or more elements of text, image, video, audio, audio-video, or graphics. The request to view may come from an audience. The audience may wish to view a project created by a creator. The project may comprise content and associated contextual information.

The input may further comprise a request to view a region according to a timeline configuration. The timeline configuration may comprise of presenting content and associated contextual information in a timeline configuration. In this configuration, a user may cycle through at least steps of display, capture, and association in a chronological and a reverse-chronological order according to an order in which the steps were performed to generate the content and associated contextual information.

Additionally or alternatively, the input may further comprise a request to view a region according to a suggested order. The suggested order may comprise an order corresponding to receiving an indication of an order in which a first indicator and a second indicator should be presented. For example, the first indicator may correspond to a first portion of content and associated contextual information, and the second indicator may correspond to a second portion of content and associated contextual information. A creator of the project containing the content and associated contextual information may suggest, by indicating, that an audience view the second portion of content and associated contextual information after viewing the first portion of content and associated contextual information.

At 3604, a portion of content and associated contextual information is presented. The presentation may be in response to and in accordance with the input at 3602.

Illustrative Computing Device

Figure 37:
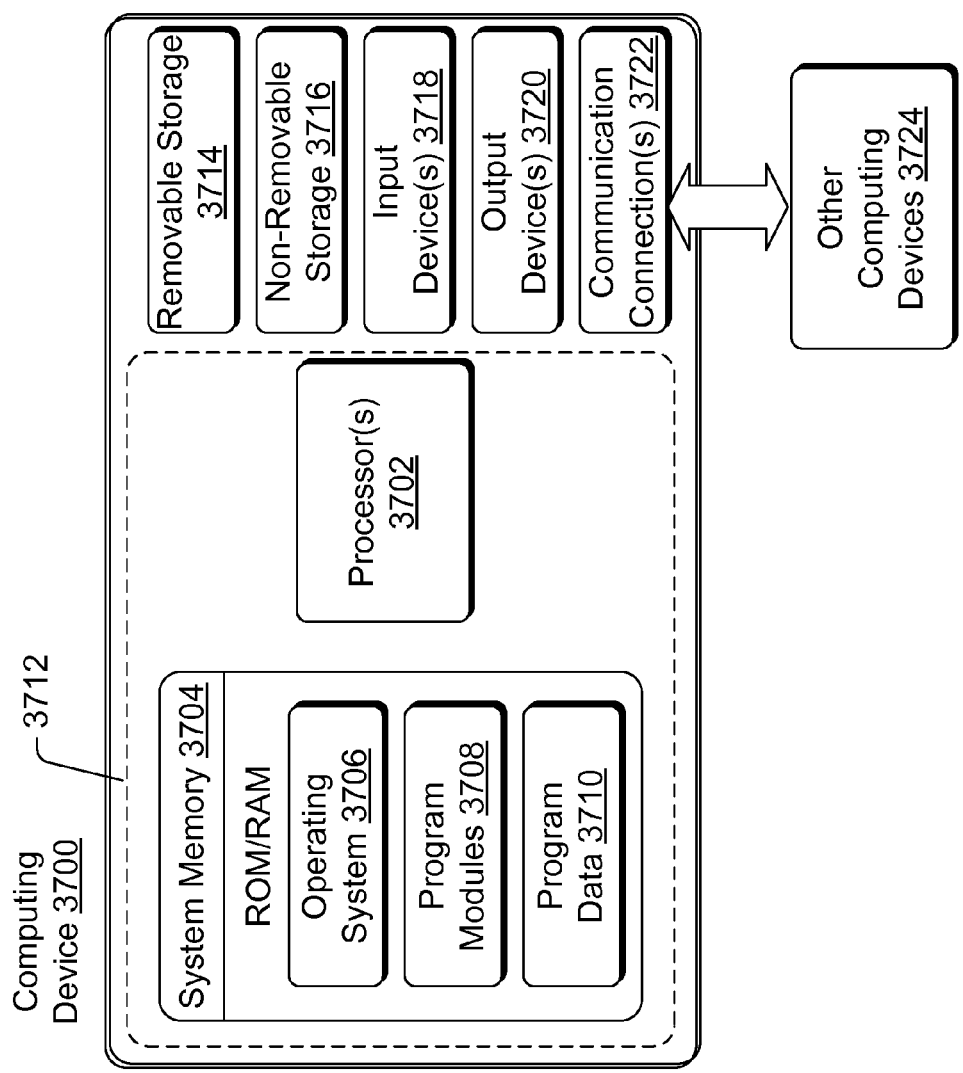
FIG. 37 is a block diagram of an illustrative computing device usable to interact with an asynchronous communication system.

FIG. 37 illustrates a representative computing device 3700 that may implement the asynchronous communication described herein, in accordance with various embodiments. The techniques and mechanisms described herein may be implemented by multiple instances of computing device 3700 as well as by any other computing device, system, and/or environment. The computing device 3700 shown in FIG. 37 is only one example of a computing device and is not intended to suggest any limitation as to the scope of use or functionality of any computing device utilized to perform the processes and/or procedures described above.

In at least one configuration, the computing device 3700 includes at least one processor 3702 and system memory 3704. The processor(s) 3702 may execute one or more modules and/or processes to cause the computing device 3700 to perform a variety of functions. In some embodiments, the processor(s) 3702 may include a central processing unit (CPU), a graphics processing unit (GPU), both CPU and GPU, or other processing units or components known in the art. Additionally, each of the processor(s) 3702 may possess its own local memory, which also may store program modules, program data, and/or one or more operating systems.

Depending on the exact configuration and type of the computing device 3700, the system memory 3704 may be volatile (such as RAM), non-volatile (such as ROM, flash memory, miniature hard drive, memory card, or the like) or some combination thereof. The system memory 3704 may include an operating system 3706, one or more program modules 3708, and may include program data 3710. The computing device 3700 is of a very basic illustrative configuration demarcated by a dashed line 3712. Again, a terminal may have fewer components but may interact with a computing device that may have such a basic configuration.

The computing device 3700 may have additional features and/or functionality. For example, the computing device 3700 may also include additional data storage devices (removable and/or non-removable) such as, for example, magnetic disks, optical disks, or tape. Such additional storage is illustrated in FIG. 37 by removable storage 3714 and non-removable storage 3716.

The storage devices and any associated computer-readable media may provide storage of computer readable instructions, data structures, program modules, and other data. Computer-readable media includes, at least, two types of computer-readable media, namely computer storage media and communications media.

Computer storage media includes volatile and non-volatile, removable and non-removable media implemented in any method or technology for storage of information such as computer readable instructions, data structures, program modules, or other data.

Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device.

In contrast, communication media may embody computer readable instructions, data structures, program modules, or other data in a modulated data signal, such as a carrier wave, or other transmission mechanism. As defined herein, computer storage media does not include communication media.

Moreover, the computer-readable media may include computer-executable instructions that, when executed by the processor(s) 3702, perform various functions and/or operations described herein.

The computing device 3700 may also have input device(s) 3718 such as a keyboard, a mouse, a pen, a voice input device, a touch input device, etc. Output device(s) 3720, such as a display, speakers, a printer, etc. may also be included.

The computing device 3700 may also contain communication connections 3722 that allow the device to communicate with other computing devices 3724, such as over a network. By way of example, and not limitation, communication media and communication connections include wired media such as a wired network or direct-wired connections, and wireless media such as acoustic, radio frequency (RF), infrared, and other wireless media. The communication connections 3722 are some examples of communication media. Communication media may typically be embodied by computer readable instructions, data structures, program modules, etc.

The illustrated computing device 3700 is only one example of a suitable device and is not intended to suggest any limitation as to the scope of use or functionality of the various embodiments described. Other well-known computing devices, systems, environments and/or configurations that may be suitable for use with the embodiments include, but are not limited to, personal computers, server computers, hand-held or laptop devices, multiprocessor systems, microprocessor-based systems, set top boxes, game consoles, programmable consumer electronics, network PCs, minicomputers, mainframe computers, distributed computing environments that include any of the above systems or devices, implementations using field programmable gate arrays ("FPGAs") and application specific integrated circuits ("ASICs"), and/or the like.

The implementation and administration of a shared resource computing environment on a single computing device may enable multiple computer users to concurrently collaborate on the same computing task or share in the same computing experience without reliance on networking hardware such as, but not limited to, network interface cards, hubs, routers, servers, bridges, switches, and other components commonly associated with communications over the Internet, as well without reliance on the software applications and protocols for communication over the Internet.

CONCLUSION

The subject matter described above can be implemented in hardware, software, or in both hardware and software. Although implementations have been described in language specific to structural features and/or methodological acts, it is to be understood that the subject matter defined in the appended claims is not necessarily limited to the specific features or acts described above. Rather, the specific features and acts are disclosed as illustrative forms of illustrative implementations of asynchronous communication facilitation. For example, the methodological acts need not be performed in the order or combinations described herein, and may be performed in any combination of one or more acts.

The invention claimed is:

1. An asynchronous communication system that allows a user to capture and communicate contextual information about content, the asynchronous communication system comprising:
   a processor;
   storage medium;
   a display; and
   programming instructions stored on the storage medium that, when executed by the processor, perform operations comprising:
   displaying content to be contextualized on the display, the content to be contextualized comprises a digital sketch created by a user;
   receiving contextual information that provides context to the content to be contextualized;
   receiving an indication indicating a portion of content to be annotated on a digital canvas;
   in response to the indication, displaying on the digital canvas an indicator indicating the portion of content to be annotated;
   linking an annotation canvas to the indicator, the annotation canvas configured to display multimodal information;
   associating the contextual information with the content to be contextualized based at least in part on the indication, the contextual information comprises multimodal information, the multimodal information comprises two or more types of elements, the two or more types of elements being selected from a group consisting of text, image, video, audio, audio-video, or graphic.

2. The asynchronous communication system of claim 1, wherein the content to be contextualized being creatable by the user in a session in which the contextual information is received.

3. The asynchronous communication system of claim 1, wherein the contextual information comprises at least one of time, place, environment, participating people, goal, topic, or an example of a similar idea.

4. The asynchronous communication system of claim 1, wherein the contextual information comprises at least one of an image, a video, a sound recording, text, animation, color, texture, shape, or a sketch.

5. The asynchronous communication system of claim 1, wherein the receiving of contextual information comprises receiving contextual information captured from a surrounding environment of the user.

6. The asynchronous communication system of claim 1, wherein the receiving of contextual information comprises receiving contextual information captured from an environment distant from the user provided to the user through a wireless connection.

7. The asynchronous communication system of claim 1, further comprising an input device, the input device comprising a digital camera, a microphone, a mouse, a touch pad, a digital pen, or a touch screen, wherein the contextual information is received from the input device.

8. The asynchronous communication system of claim 1, wherein:
   the contextual information comprises an element captured from the real world, the element comprising a color or a texture; and
   the element further comprising a sample from captured content or real-time video feed.

9. The asynchronous communication system of claim 1, wherein:

the contextual information comprises an element captured from the real world, the element comprising a shape; and the shape having been received from a user over captured content or real-time video feed.

10. The asynchronous communication system of claim 1, the operations further comprising displaying content to be contextualized and associated contextual information in a timeline configuration wherein the user may cycle through at least the steps of display, capture, and association in a chronological and a reverse-chronological order according to an order in which the steps were performed.

11. The asynchronous communication system of claim 1, the operations further comprising:

associating content to be contextualized with contextual information comprising audio, video, or audio-video, wherein, at least a portion of the content to be contextualized being generated by a user contemporaneously as the contextual information is captured; and providing a control usable to present the generated content to be contextualized in a number of creation steps synchronized with a presentation of the contemporaneously captured contextual information.

12. The asynchronous communication system of claim 11, wherein:

the content to be contextualized comprises a sketch drawn by the user;

the contextual information comprises a recording of the user verbally describing context of the sketch; and providing the control usable to present comprises providing the control to facilitate display of a representation of the sketch drawn by the user displayed over a time in steps, the steps corresponding to a chronological order in which the sketch was created, the time corresponding to the length of the recording.

13. The asynchronous communication system of claim 1, the operations further comprising displaying the annotation canvas linked to the indicator, wherein the indicator comprises a border, the border defining an annotated area, the annotated area having an opacity, wherein the opacity being inversely proportional to the size of the annotated area.

14. The asynchronous communication system of claim 13, wherein the indication comprises receipt of an input on a touch screen on which the digital canvas is displayed.

15. The asynchronous communication system of claim 14, wherein the input comprises a border around the portion of content to be annotated indicating the portion of content to be annotated.

16. The asynchronous communication system of claim 13, wherein the annotation canvas is configured to be moveable or fixed in relationship to the indicator.

17. One or more computer-readable storage media storing computer-executable instructions that, when executed by a processor, configure the processor to perform acts comprising:

receiving an indication of a first portion of content to be contextualized and an associated annotation;

in response to the indication of the first portion, displaying a first indicator indicating the portion of content to be contextualized and the associated annotation;

receiving an indication of a second portion of content to be contextualized and an associated annotation;

in response to the indication of the second portion, displaying a second indicator indicating the portion of content to be contextualized and associated annotation;

receiving an indication of an order in which the first portion and second portion should be displayed; and in response to the indication of the order, presenting the first indicator and the second indicator according to the order.

18. A method of asynchronous communication, the method comprising:

receiving an input indicating a request to view an annotated region, the annotated region comprising a portion of content and associated contextual information, the content comprising a digital sketch, the contextual information comprising multimodal information, the multimodal information comprising two or more types of elements, each of the two or more types of elements including at least one of text, image, video, audio, audio-video, or graphic;

identifying a suggested order by which to view the annotated region, the suggested order being based at least in part on a received progression indication menu indicating an order in which a first indicator and a second indicator should be presented, the first indicator corresponding to a first portion of the content and associated contextual information, the second indicator corresponding to a second portion of the content and associated contextual information, the progression indication menu including a first step mark and a second step mark, the first step mark comprising an area representing at least one of the first portion of the content or a shape of the first indicator, the second step mark comprising an area representing at least one of the second portion of the content or a shape of the second indicator; and in response to the indication of the request, presenting the annotated region according to the suggested order.

19. The method of claim 18, the presenting the annotated region according to the suggested order comprises:

receiving a selection of one of the first indicator or the second indicator;

in response to receiving the selection, presenting the one of the first indicator or the second indicator;

receiving a selection of the other of the first indicator or the second indicator; and in response to receiving the selection of the other of the first indicator or the second indicator, presenting the other of the first indicator or second indicator.

20. The method of claim 18, the suggested order comprising an order specified at the time of creation of the presentation by which to view the annotated region.

* * * * *